United States Patent
Mangat et al.

(10) Patent No.: US 12,038,824 B2
(45) Date of Patent: Jul. 16, 2024

(54) RECORD-REPLAY TESTING FRAMEWORK WITH MACHINE LEARNING BASED ASSERTIONS

(71) Applicant: ThoughtSpot, Inc., San Jose, CA (US)

(72) Inventors: Atul Mangat, Amroha (IN); Varsha Lalwani, Orai (IN); Divesh Gandhi, Bengaluru (IN)

(73) Assignee: ThoughtSpot, Inc., Mountain View, CA (US)

( * ) Notice: Subject to any disclaimer, the term of this patent is extended or adjusted under 35 U.S.C. 154(b) by 72 days.

(21) Appl. No.: 17/830,824

(22) Filed: Jun. 2, 2022

(65) Prior Publication Data

US 2023/0393963 A1    Dec. 7, 2023

(51) Int. Cl.
*G06F 11/36*    (2006.01)
(52) U.S. Cl.
CPC ...... *G06F 11/3612* (2013.01); *G06F 11/3688* (2013.01)
(58) Field of Classification Search
CPC .......................... G06F 11/3612; G06F 11/3688
USPC .......................................................... 714/26
See application file for complete search history.

(56) References Cited

U.S. PATENT DOCUMENTS

| | | | |
|---|---|---|---|
| 2020/0019418 A1* | 1/2020 | P K | G06F 9/453 |
| 2023/0052691 A1* | 2/2023 | Thiruvenkatanathan | G06N 20/20 |

OTHER PUBLICATIONS

Playwright, dev testing for web apps, Microsoft 2022, 3 pages, Retrieved on Jun. 1, 2022 from https://playwright.dev/.
Heller, What is Jenkins? The CI server explained, InfoWorld Mar. 9, 2020, 14 pages, Retrieved on Jun. 1, 2022 from https://www.infoworld.com/article/3239666/what-is-jenkins-the-ci-server-explained.html.
Ranjan, Selenium Locators, ToolsQA.com Nov. 17, 2021, 17 pages, Retrieved on Jun. 1, 2022 from https://www.toolsqa.com/selenium-webdriver/selenium-locators/.

* cited by examiner

*Primary Examiner* — Yair Leibovich
(74) *Attorney, Agent, or Firm* — Young Basile Hanlon & MacFarlane, P.C.

(57) ABSTRACT

A replay tool configured in a learning mode is used to replay a recorded interaction workflow to obtain respective learning-mode test data responsive to a request from a client device to a server. A baseline response template is obtained from the respective learning-mode test data. A baseline response time of the request is also obtained from the respective learning-mode test data. The recorded interaction workflow is replayed in a testing mode to obtain testing-mode test data. Responsive to determining that a response body included in the testing-mode test data is inconsistent with the baseline response template, a first anomaly message is output. Responsive to determining that the response time included in the testing-mode test data is not within a tolerance of the baseline response time, a second anomaly message is output.

20 Claims, 10 Drawing Sheets

RECORD-REPLAY TESTING FRAMEWORK WITH MACHINE LEARNING BASED ASSERTIONS

BACKGROUND

Multi-tiered systems are complex and may require significant testing efforts. Disparate testing tools, techniques, and approaches may be employed to test the different tiers of a multi-tiered system. To test a feature of a multi-tiered system, backend tests (i.e., test cases related to the feature and implemented by the backend tier), frontend tests (i.e., test cases related to the feature and implemented by the frontend tier), and performance tests, among others, may be performed.

SUMMARY

Disclosed herein are implementations of record-replay testing framework with machine learning based assertions.

An aspect of the disclosed implementations is a method that includes replaying, using a replay tool configured in a learning mode, a recorded interaction workflow to obtain respective learning-mode test data responsive to a request from a client device to a server, where the recorded interaction workflow is obtained using a screen record-replay tool; obtaining a baseline response template from the respective learning-mode test data; obtaining a baseline response time of the request from the respective learning-mode test data; replaying, using the replay tool configured in a testing mode, the recorded interaction workflow to obtain testing-mode test data; determining that a response body included in the testing-mode test data is inconsistent with the baseline response template; responsive to determining that the response body is inconsistent with the baseline response template, outputting a first anomaly message; determining that a response time included in the testing-mode test data is not within a tolerance of the baseline response time; and responsive to determining that the response time is not within the tolerance of the baseline response time, outputting a second anomaly message.

An aspect of the disclosed implementation is a device that includes a memory and a processor. The processor is configured to execute instructions stored in the memory to receive respective learning-mode test data responsive to a request from a client device to a server, where the respective learning-mode test data are obtained by replaying at the client device, in a learning mode, a recorded interaction workflow that includes the request; obtain a baseline response template from the respective learning-mode test data; receive testing-mode test data from a replay of the recorded interaction workflow in a testing mode; and, responsive to determining that a response body included in the testing-mode test data is inconsistent with the baseline response template, output a first anomaly message.

An aspect of the disclosed implementation is a non-transitory computer readable medium storing instructions operable to cause one or more processors to perform operations that include receiving respective learning-mode test data to a request transmitted from a client device to a server, where the respective learning-mode test data correspond to replaying using a replay tool at the client device, a number of times and in a learning mode, a recorded interaction workflow that includes the request; obtaining a baseline response template from the respective learning-mode test data; receiving testing-mode test data from a replay, using the replay tool in a testing mode, of the recorded interaction workflow; determining that a response template included in the testing-mode test data is inconsistent with the baseline response template; and, responsive to determining that the response template is inconsistent with the baseline response template, outputting a first anomaly message.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
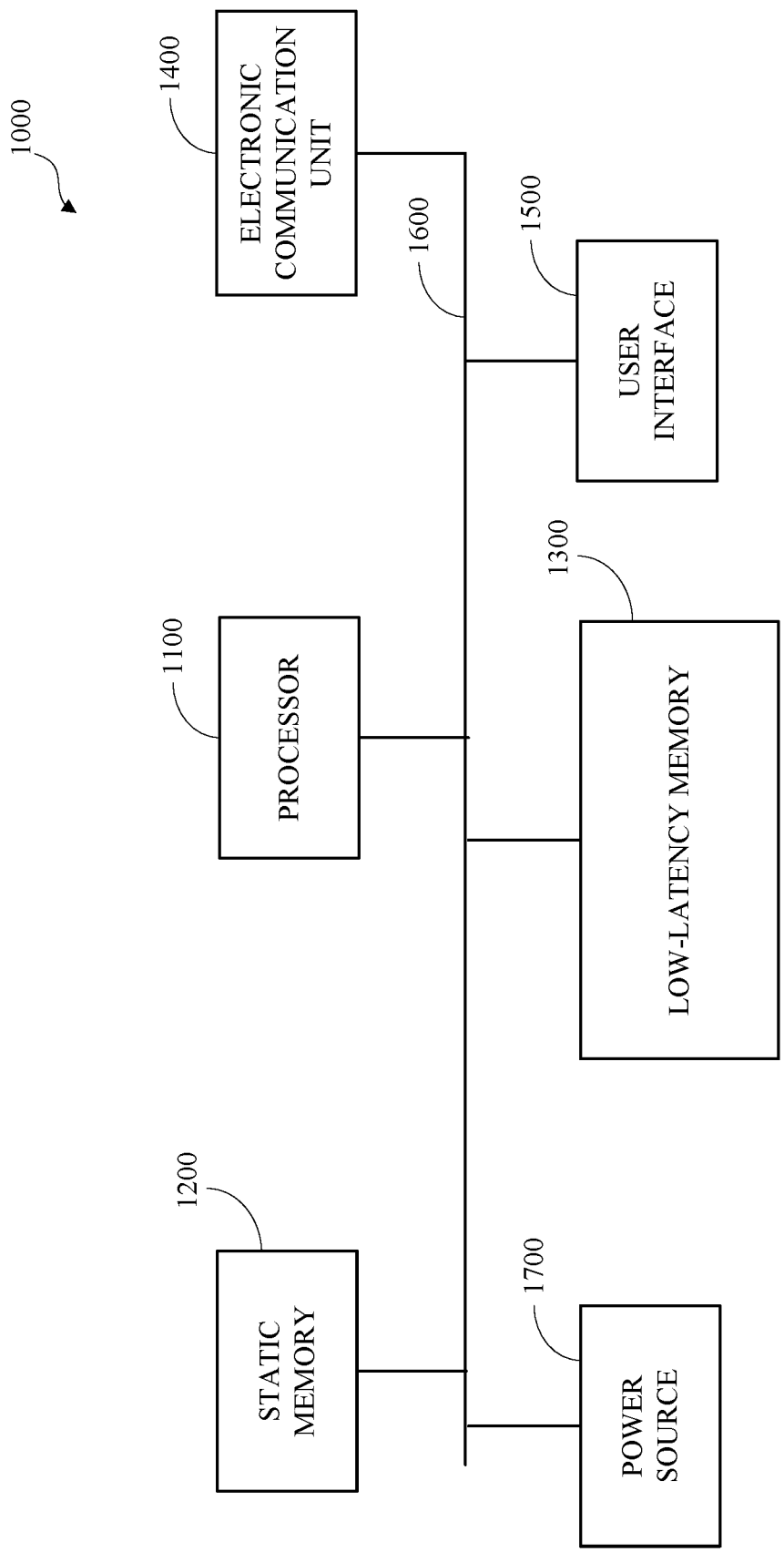
FIG. 1 is a block diagram of an example of a computing device.

A data access and analysis system, such as a low-latency data access and analysis system as described herein, may receive data expressing usage intent for a user, may process the data expressing usage intent, may retrieve data in response to the data expressing usage intent, may process the retrieved data, and may output a response responsive to the received data expressing usage intent. The data analysis system may include a significant and interrelated number of features, and may be a multi-tiered system that may include a presentation or user-interface tier (referred to herein as a frontend tier), an application processing tier (referred to herein as a business logic tier or backend tier), and a data tier. Each of the backend tier and the data tier may be or include distributed clusters, as described herein.

Multitiered systems are complex and may require significant testing efforts. More broadly, a system to be tested, is referred to herein as a "target system." Testing may be performed to verify that, when a previously tested system is updated or modified, regressions and adverse (e.g., unintended) results or side effects are not introduced into the system.

Testing may utilize a substantial amount of resources, such as human resources, compute resources, or both, such as for documenting and executing (e.g., performing) test cases, such as backend test cases, frontend test cases, or both. A test, or test case, can be or include a set of actions that are carried out (e.g., automatically executed, manually performed, etc.) to determine whether a target system (or a feature thereof) functions as expected. For example, testing constituents or system stakeholder (collectively referred to as "QA engineers" for brevity) may spend a significant amount of time documenting backend and frontend test cases and then automating and executing these test cases. One or more approaches or tools may be used to develop and execute test cases.

To develop backend tests for a feature, QA engineers gain a thorough understanding of the feature, enumerate the test cases that test different aspects of the feature, and automate these test cases. To automate the test cases, the QA engineers may enumerate the application programming interfaces (APIs) that implement or support the feature or services related to the feature, and write test programs that invoke (e.g., exercise) these APIs. A test program may include calls to several APIs therewith creating API workflows. The QA engineers may manually add assertions in such programs to validate that results (e.g., received responses from APIs) are as expected. Failed assertions may be indicative of regressions or errors.

To develop the frontend tests for a feature, QA engineers gain a thorough understanding of the feature and how end-users may interact with the feature, and may automate user interactions (i.e., interaction workflows). Screen record-and-replay frameworks, or custom-developed programs, may be used to automate frontend test cases. Frontend testing may be used to verify human interactions with the system including outputs displayed to the user. To illustrate, and with reference to a web-based user interface (UI), such as a UI available through a web browser, a frontend testing framework may be able to perform (e.g., simulate) actions (such as pressing a button, filling a field with a value, clicking a hyperlink, pressing a keyboard key, etc.) on the HyperText Markup Language (HTML) elements of a webpage much like a human user can. The QA engineers add assertions in such programs to validate that screen layouts and displayed data are as expected.

The process of validating and mocking APIs is typically not straightforward and may require significant time and effort. For example, and depending on the complexity of a feature, it is not atypical that four to six weeks of effort may be required to mock the APIs. Furthermore, changes in API signatures or addition of new APIs require modifications to the test programs. Furthermore, any manually added assertions may be erroneous or inaccurate.

Another problem with the above approaches or tools available for backend testing is that they do not include inherent support for performance benchmarking of APIs. Thus, API performance testing is typically undertaken as a separate testing activity from backend testing. To illustrate, assume that performance testing of a checkout API of an e-commerce website is to be performed, a test program may be written (e.g., mocked up) and executed several times. After tracking the response times over the several executions and determining a desired response time, a QA engineer may modify the test program to add an assertion to flag the response time of the API as a performance regression if the response time ever violated the desired time during testing. Yet another problem with the above approaches or tools available for backend testing is that they do not include capabilities for capturing server statistics to analyze server performance as API calls are being executed.

Different types of testing (e.g., frontend, backend, and performance testing) require different test runs therewith increasing compute resource utilization. High resource utilization may include or require substantially increased investment in processing, memory, and storage resources and may also result in increased energy expenditures (needed to operate those increased processing, memory, and storage resources, and for network transmissions) and associated emissions that may result from the generation of that energy.

A record-replay testing framework with machine learning based assertions (referred to, for brevity, as a "testing software"), improves accuracy, efficiency, or both, relative to other system testing tools and techniques. The testing software reduces or eliminates the resource utilization, inaccuracies, and conflicts associated with separate backend, frontend, and benchmark testing therewith speeding up product release cadence, improving productivity, and reducing the number of tests. The testing software can also reduce potential conflicts (e.g., inconsistencies) between test cases. In some embodiments, resource utilization associated with testing may be reduced by automating the execution of test cases as described herein.

The testing software includes a training phase or mode and a testing phase or mode. Using a user-interface (e.g., a web browser), user interactions with a feature may be recorded and output in the form of an executable (i.e., replayable) test program (e.g., a script). In the learning mode, the test program can be replayed, such as with respect to a first version of the target system, several times to build a dataset of baseline results. Machine-learning (ML) models can be trained using at least some parts of the learning-mode test data to obtain the baseline results. During the testing phase, the test program can be replayed, such as with respect to a second version of the target system, to obtain testing-mode test data. The ML model(s) can be used to identifies any anomalies in the testing-mode test data by comparing the testing-mode test data to the baseline results.

Anomalies in server-side performance statistics can also be detected. The testing software can monitor and collect server statistics of a server. A server data collection tool may execute at the server to collect the server statistics at a regular frequency The testing software can use the server statistics to detect unexpected behavior of these collected metrics (i.e., statistics) while a particular interaction workflow or a particular interaction of the workflow is executing (i.e., being tested).

Using a testing software as described herein, the resource utilization associated with manually adding testing assertions may be reduced or eliminated. For example, assertions may not need to be manually added to test scripts. Instead, machine learning algorithms can be used to learn assertions and to validate the learnt assertions. Using the testing software described herein, compute resource utilization can be reduced since API (backend) testing, user-interface (frontend) testing, and performance testing can be performed, and server statistics can be collected in a same test run (e.g., using a same test script).

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit.

Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active-matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
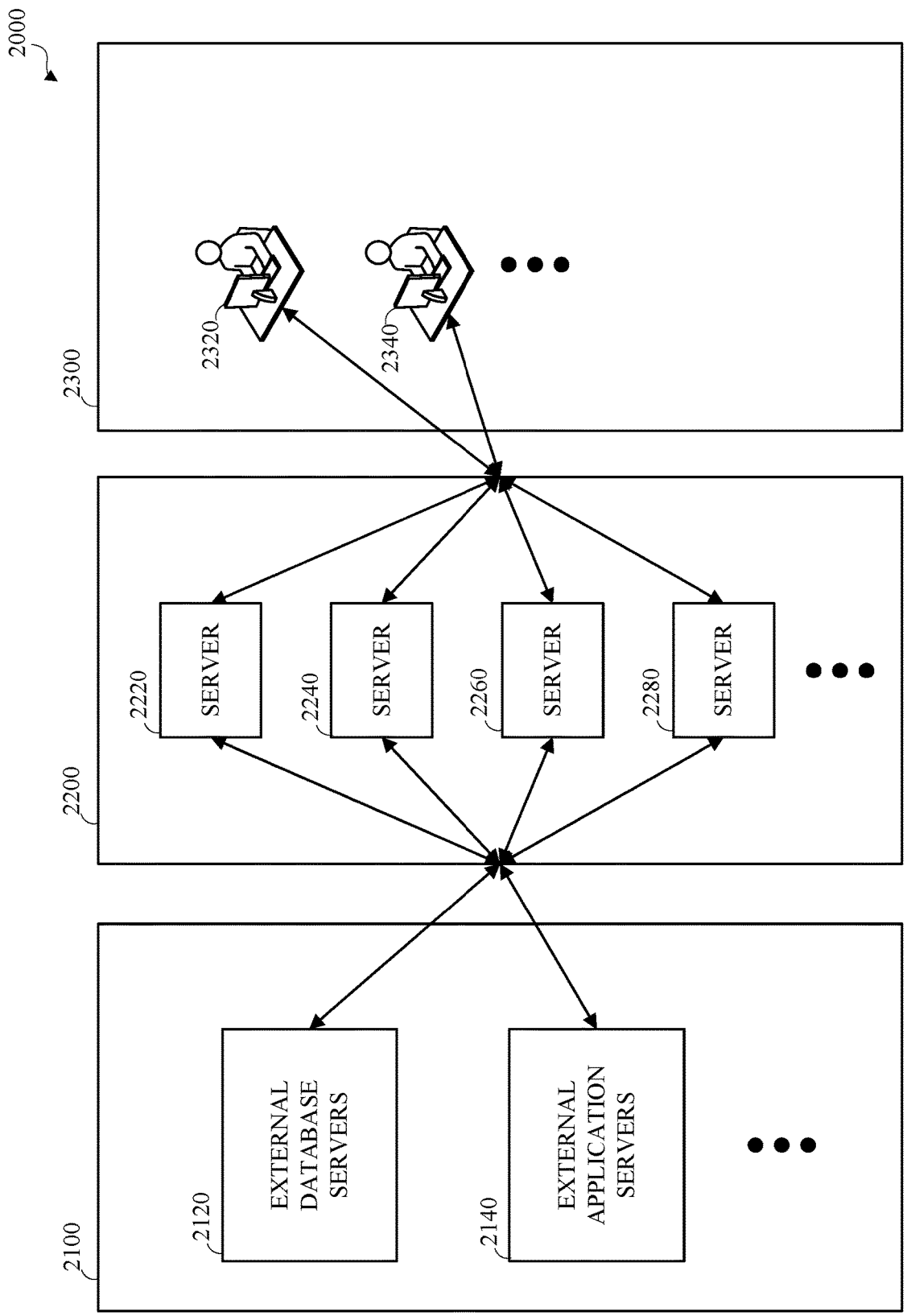
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second party). The internal database analysis portion 2200 may be associated with, such as created by or controlled by, a person, entity, or organization (first party). The system interface portion 2300 may be associated with, such as created by or controlled by, the first party and may be accessed by the first party, the second party, third parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second party) associated with the external data source portion 2100, including but not limited to external database servers 2120 and external application servers 2140. The external computing devices may include data regarding the operation of the external person, entity, or organization (second party) associated with the external data source portion 2100.

The external database servers 2120 may be one or more computing devices configured to store data in a format and schema determined externally from the internal database analysis portion 2200, such as by a second party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second party) associated with the external data source portion 2100, communications between the external person, entity, or organization (second party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, meteorological data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response, or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
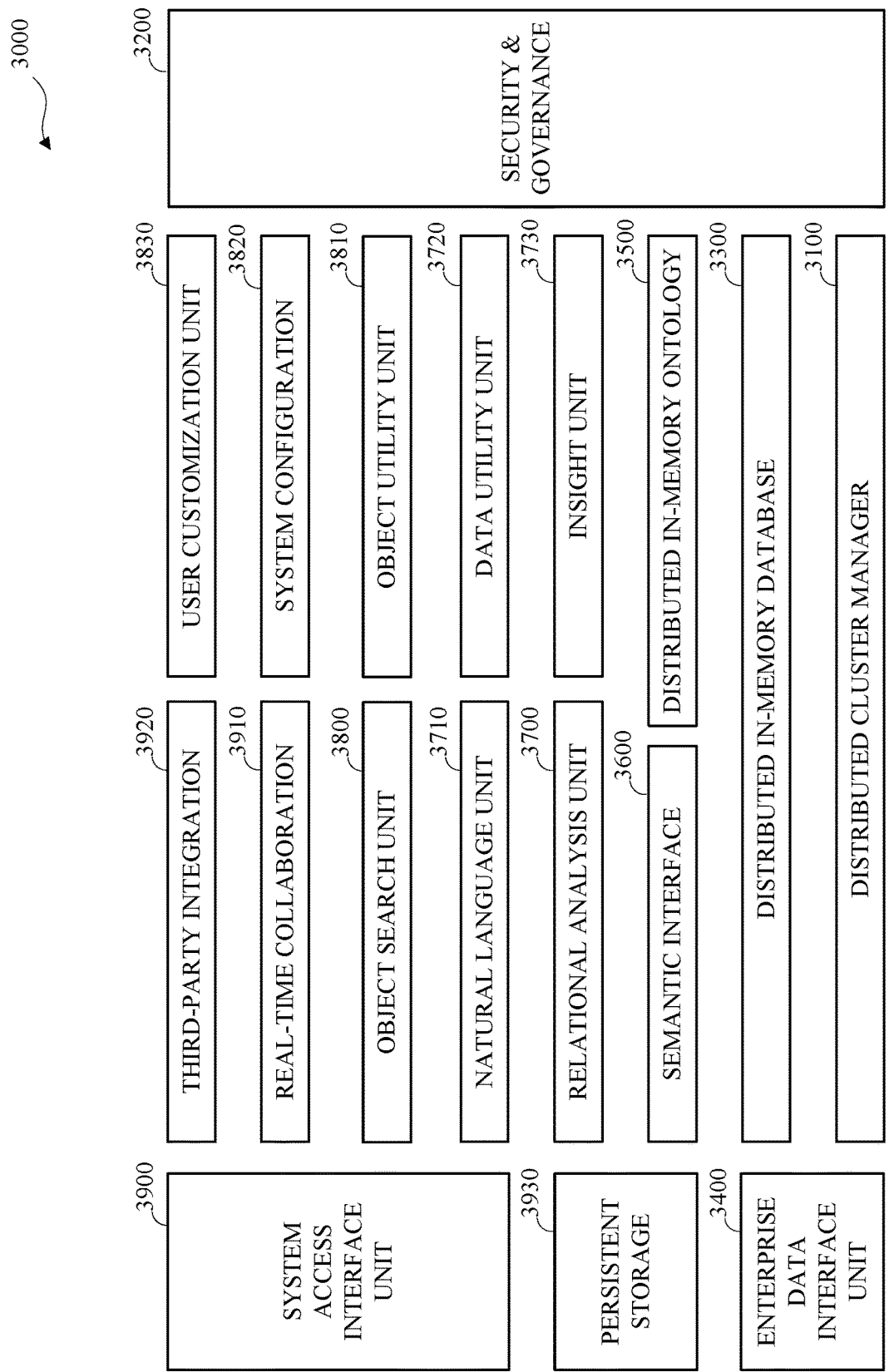
FIG. 3 is a block diagram of an example of a low-latency data access and analysis system.

FIG. 3 is a block diagram of an example of a low-latency data access and analysis system 3000. The low-latency data access and analysis system 3000, or aspects thereof, may be similar to the internal database analysis portion 2200 shown in FIG. 2, except as described herein or otherwise clear from context. The low-latency data access and analysis system 3000, or aspects thereof, may be implemented on one or more computing devices, such as servers 2220, 2240, 2260, and 2280 shown in FIG. 2, which may be in a clustered or distributed computing configuration. As used herein, the terms "low-latency data access and analysis system," "low-latency data analysis system," and "low-latency database analysis system" indicate a computer implemented system, such as the low-latency data access and analysis system 3000 shown in FIG. 3, that obtains, stores, organizes, processes, automatically analyzes, and outputs data and visualizations thereof.

The low-latency data access and analysis system 3000, which may be a low-latency database analysis system, may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency data access and analysis system 3000 may be implemented as one or more logical devices in a cloud-based configuration optimized for automatic database analysis.

As shown, the low-latency data access and analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational analysis unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency data access and analysis system 3000.

Although not expressly shown in FIG. 3, one or more of the components of the low-latency data access and analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency data access and analysis system 3000, or respective aspects thereof, may be combined or otherwise organized.

The low-latency data access and analysis system 3000 may include different, fewer, or additional components not shown in FIG. 3. The aspects or components implemented in an instance of the low-latency data access and analysis system 3000 may be configurable. For example, the insight unit 3730 may be omitted or disabled. One or more of the components of the low-latency data access and analysis system 3000 may be implemented in a manner such that aspects thereof are divided or combined into various executable modules or libraries in a manner which may differ from that described herein.

The low-latency data access and analysis system 3000 may implement API, which may monitor, receive, or both, input signals or messages from external devices and systems, client systems, process received signals or messages, transmit corresponding signals or messages to one or more of the components of the low-latency data access and analysis system 3000, and output, such as transmit or send, output messages or signals to respective external devices or systems. The low-latency data access and analysis system 3000 may be implemented in a distributed computing configuration.

The distributed cluster manager 3100 manages the operative configuration of the low-latency data access and analysis system 3000. Managing the operative configuration of the low-latency data access and analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency data access and analysis system 3000, such as in one or more tables, identifying the operative configuration of the low-latency data access and analysis system 3000. For example, the distributed cluster manager 3100 may automatically update the low-latency data access and analysis system configuration data in response to an operative configuration event, such as a change in availability or performance for a physical or logical unit of the low-latency data access and analysis system 3000. One or more of the component units of low-latency data access and analysis system 3000 may access the data analysis system configuration data, such as to identify intercommunication parameters or paths.

The security and governance unit 3200 may describe, implement, enforce, or a combination thereof, rules and procedures for controlling access to aspects of the low-latency data access and analysis system 3000, such as the internal data of the low-latency data access and analysis system 3000 and the features and interfaces of the low-latency data access and analysis system 3000. The security and governance unit 3200 may apply security at an ontological level to control or limit access to the internal data of the low-latency data access and analysis system 3000, such as to columns, tables, rows, or fields, which may include using row-level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency data access and analysis system 3000. The distributed in-memory database 3300 and the low-latency data stored therein, or a portion thereof, may be accessed using commands, messages, or signals in accordance with a defined structured query language associated with, such as implemented by, the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency data access and analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query, or a portion thereof, may be expressed in accordance with a defined structured query language implemented by a defined database other than the distributed in-memory database 3300, such as an external database. In some implementations, a data-query may be included, such as stored or communicated, in a data-query data structure or container.

The distributed in-memory database 3300 may execute or perform one or more queries to generate or obtain response data responsive to the data-query based on the low-latency data. Unless expressly described, or otherwise clear from context, descriptions herein of a table in the context of performing, processing, or executing a data-query that include accessing, such as reading, writing, or otherwise using, a table, or data from a table, may refer to a table stored, or otherwise maintained, in the distributed in-memory database independently of the data-query or may refer to tabular data obtained, such as generated, in accordance with the data-query.

The distributed in-memory database 3300 may interpret, evaluate, or otherwise process a data-query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency data access and analysis system 3000. The enterprise data interface unit 3400 may receive, or otherwise access, the enterprise data from one or more external data sources, such as the external data source portion 2100 shown in FIG. 2, and may represent the enterprise data in the low-latency data access and analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Although not shown separately in FIG. 3, the low-latency data access and analysis system 3000 implements a canonical, or system-defined, chronometry. The system-defined chronometry defines the measurement, storage, processing, organization, scale, expression, and representation of time and temporal data in the low-latency database analysis system 3000. For example, the system-defined chronometry may correspond with a Gregorian calendar, or a defined variant thereof. The system-defined chronometry defines one or more chronometric units, which may be nominal, or named, representations of respective temporal intervals. A reference chronometric unit, such as a 'second' chronometric unit, may represent a minimal temporal interval in the low-latency database analysis system. One or more aspects of the system-defined chronometry may be defined by the operating environment of the low-latency database analysis system, such as by a hardware component, an operating system, or a combination thereof. For example, a hardware component, such as a system clock (clock circuit) may define the temporal interval of the reference chronometric unit and an operating system may define one or more other chronometric units with reference to the reference chronometric unit.

The low-latency database analysis system 3000 may define or describe one or more chronometric unit types, such as a 'minute' chronometric unit type, an 'hour' chronometric unit type, a 'day' chronometric unit type, a 'week' chronometric unit type, a 'month' chronometric unit type, a 'quarter' chronometric unit type, a 'year' chronometric unit type, or any other type of chronometric unit. A temporal point may be represented, such as stored or processed, in the low-latency database analysis system as an epoch value, which may be an integer value, such that each temporal point from the contiguous sequence of temporal points that comprises the temporal continuum corresponds with a respective epoch value. A temporal location may be represented in the low-latency database analysis system as an epoch value and may be expressed in the low-latency database analysis system using one or more chronometric units, or respective values thereof. The system-defined chronometry defines respective descriptors, such as a day-of-week-name, month-name, and the like. Data defining or describing the system-defined chronometry may be stored in the low-latency data access and analysis system as a chronometric dataset. In some implementations, the low-latency data access and analysis system may define or describe a domain-specific chronometry that differs from the system-defined chronometry. The chronometric units defined or described by the domain-specific chronometry, except for the reference chronometric unit, may differ from the chronometric units defined or described by the system-defined chronometry. Data defining or describing the domain-specific chronometry may be stored in the low-latency data access and analysis system as a chronometric dataset.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency data access and analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, an access context, an answer, an insight, a pinboard, a tag, a comment, a trigger, a defined variable, a data source, an object-level security rule, a row-level security rule, or any other data capable of being distinctly identified and stored or otherwise obtained in the low-latency data access and analysis system 3000. An object may represent or correspond with a logical entity. Data describing an object may include data operatively or uniquely identifying data corresponding to, or represented by, the object in the low-latency data access and analysis system. For example, a column in a table in a database in the low-latency data access and analysis system may be represented in the low-latency data access and analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may represent a defined, such as previously generated, request for data, such as a resolved request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

An access context (access-context object) may be a set or collection of data associated with, such as including, data expressing usage intent, such as a request for data, data responsive to data expressing usage intent, or a discretely related sequence or series of requests for data or other interactions with the low-latency data access and analysis system 3000, and a corresponding data structure for containing such data. For example, data expressing usage intent may be generated by the low-latency data access and analysis system 3000, or a component thereof, such as the system access interface unit 3900, such as in response to input, such as user input, obtained by the low-latency data access and analysis system 3000. In another example, data expressing usage intent may be obtained, received, or otherwise accessed, by the low-latency data access and analysis system 3000, or a component thereof, from an external device or system.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency data access and analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. A data source object (external data source object) may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency data access and analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency data access and analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, resolved-request objects, and the like. Secondary objects may be referred to herein as analytical-objects.

Tertiary objects may be objects representing distinctly identifiable operative data units or structures representing operational aspects of the low-latency data access and analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components. The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency data access and analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency data access and analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency data access and analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency data access and analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational analysis unit 3700 indicating that the ontology has changed.

The semantic interface unit 3600 may receive, or otherwise access, a request message or signal, such as from the relational analysis unit 3700, indicating a request for information describing changes to the ontology (ontological updates request). The semantic interface unit 3600 may generate and send, or otherwise make available, a response message or signal to the relational analysis unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing usage intent, such as data indicating requests to access or modify the low-latency data stored in the distributed in-memory database 3300 (e.g., a request for data). The request to access or modify the low-latency data received by the semantic interface unit 3600 may include a resolved request (resolved-request data), such as in a resolved-request object, such as a resolved-request object generated by the relational analysis unit 3700. The resolved request data, which may be database and visualization agnostic, may be expressed or communicated as an ordered sequence of tokens, which may represent semantic data.

The resolved-request data may include tokenization binding data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used.

The resolved-request data may include phrasing data indicating phrasing with respect to the sequence of tokens in the resolved request, wherein tokens, such as one or more sequential tokens, are included in a respective phrase. The phrasing data may include phrase type data for respective phrases. For some tokens, or sequences of tokens, the phrasing data may indicate that the sequence of tokens corresponds with a value stored in a data source, such as in a column in a table, wherein the phrasing data includes data uniquely identifying the data source, such as a column identifier.

A token is a unit of data in the low-latency data access and analysis system 3000 that represents, in accordance with one or more defined grammars implemented by the low-latency data access and analysis system 3000, a data portion accessed by or stored in the low-latency data access and analysis system 3000, an operation of the low-latency data access and analysis system 3000, an object represented in the low-latency data access and analysis system 3000, or a class or type of data portion, operation, or object in the low-latency data access and analysis system 3000. A token may be a value (token value), such as a string value, which may be a word, a character, a sequence of characters, a symbol, a combination of symbols, or the like. In some implementations, the token value may express a data pattern that defines or describes values, operations, or objects that the token represents. For example, the data pattern expressed by the token value may identify a data type, such as positive integer, such that positive integer values, or string values that may be represented as positive integer values, may be identified as matching the token. A token may be a defined data structure (token data structure) that includes a token value. A token data structure may include data other than the token value, such as token type data.

The defined grammars implemented by the low-latency data access and analysis system 3000 may define or describe the tokens. The defined grammars implemented by the low-latency data access and analysis system 3000 may define or describe token types or classes, such as ontological tokens, control-word tokens, pattern tokens, literal tokens, chronometric tokens, and a skip-token. Other token types may be used.

An ontological token may represent a data portion in the low-latency data access and analysis system, such as an object represented in the low-latency data access and analysis system 3000, or a portion thereof, a table stored in the distributed in-memory database or stored in an external database, a column of a table stored in the distributed in-memory database or stored in an external database, or a value (constituent data) stored in a row and column of a table stored in the distributed in-memory database or stored in an external database. In some grammars implemented by the low-latency data access and analysis system 3000 the ontological tokens may include measure tokens representing measure data portions (measure columns), attribute tokens representing attribute data portions (attribute columns), and value tokens representing the respective values stored in the corresponding measure columns or attribute columns. For example, a worksheet object (analytical-object) represented in the low-latency data access and analysis system 3000 may include a column that includes values generated based on values stored in one or more tables in the distributed in-memory database, and an ontological token may represent the column of the worksheet object.

A control-word token may be a character, a symbol, a word, or a defined ordered sequence of characters or symbols, defined or described in one or more grammars of the low-latency data access and analysis system 3000 as having one or more defined grammatical functions, which may be contextual. For example, the control-word token "sum" may be defined or described in one or more grammars of the low-latency data access and analysis system 3000 as indicating an additive aggregation. In another example, the control-word token "top" may be defined or described in one or more grammars of the low-latency data access and analysis system 3000 as indicating a maximal value from an ordered set. In another example, the control-word token "table" may be defined or described in one or more grammars of the low-latency data access and analysis system 3000 as indicating a table stored in the low-latency data access and analysis system 3000 or stored externally and accessed by the low-latency data access and analysis system 3000. The control-word tokens may include operator tokens, such as the equality operator token ("="), delimiter tokens, which may be paired, such as opening and closing brackets ("[", "]"). The control-word tokens may include stop-word tokens, such as "the" or "an".

A pattern token may be a definition or a description of units of data in the low-latency data access and analysis system, which may be expressed as a data type, such as positive integer, defined or described in one or more grammars of the low-latency data access and analysis system 3000.

A literal, or constant, token may include a literal, or constant, value such as "100" or the Boolean value TRUE. The literal, or constant, tokens may include number-word tokens (numerals or named numbers), such as number-word tokens for the positive integers between zero and one million, inclusive, or for the numerator, denominator, or both of fractional values, or combinations thereof. For example, "one hundred twenty-eight and three-fifths".

A chronometric token may represent a chronometric unit, such as a chronometric unit from the system-defined chronometry or a chronometric unit from a domain-specific chronometry defined or described in the low-latency data access and analysis system 3000. The chronometric tokens are automatically generated based on the respective chronometric datasets. For example, chronometric tokens corresponding to the chronometric units for the system-defined chronometry, such as "date", "day", "days", "daily", "week", "weeks", "weekly", "month", "months", "monthly", "quarter", "quarters", "quarterly", "year", "years", "yearly", and the like, may be automatically generated based on the chronometric dataset for the system-defined chronometry.

The skip-token may represent discrete data portions, such as respective portions of a string that are unresolvable in accordance with the other tokens defined or described in a respective grammar of the low-latency data access and analysis system 3000.

The relational analysis unit 3700 may automatically generate respective tokens representing the attributes, the measures, the tables, the columns, the values, unique identifiers, tags, links, keys, or any other data portion, or combination of data portions, or a portion thereof.

For example, the relational analysis unit 3700 may tokenize, identify semantics, or both, based on input data, such as input data representing user input, to generate the resolved request. The resolved request may include an ordered sequence of tokens that represent the request for data corresponding to the input data, and may transmit, send, or otherwise make accessible, the resolved request to the semantic interface unit 3600. The semantic interface unit 3600 may process or respond to a received resolved request.

The semantic interface unit 3600 may process or transform the received resolved request, which may be, at least in part, incompatible with the distributed in-memory database 3300, to generate one or more corresponding data-queries that are compatible with the distributed in-memory database 3300, which may include generating a proto-query representing the resolved request, generating a pseudo-query representing the proto-query, and generating the data-query representing the pseudo-query.

The semantic interface unit 3600 may generate an analytical-object, such as an answer object, representing the resolved request, which may include representing the data expressing usage intent, such as by representing the request for data indicated by the data expressing usage intent.

The semantic interface unit 3600 may generate a proto-query based on the resolved request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved request may include generating and issuing multiple data-queries to the distributed in-memory database 3300.

The semantic interface unit 3600 may receive results data from the distributed in-memory database 3300 responsive to one or more resolved requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. In some implementations, the security and governance unit 3200 may implement, or partially implement, the object-level security, row-level security, or a combination thereof, in combination with the semantic interface unit 3600. Object-level security may include security associated with an object, such as a table, a column, a worksheet, an answer, or a pinboard. The object-level security may include column-level security, which include user-based or group-based access control of columns of data in the low-latency data, the indexes, or both. Row-level security may include user-based or group-based access control of rows of data in the low-latency data, the indexes, or both. The semantic interface unit 3600 may implement one or more authentication procedures, access control procedures, or a combination thereof. The object-level security, row-level security, column-level security, a combination thereof, or a portion thereof, may be represented, expressed, defined, or described as access-control data. The semantic interface unit 3600, or one or more other components of the low-latency data access and analysis system 3000, may control, such as grant, restrict, or prevent, access to one or more features, functions, units of data, or combinations thereof, in accordance with the access-control data. For example, in response to a request for data that includes a user identifier, the semantic interface unit 3600, or one or more other components of the low-latency data access and analysis system 3000, may obtain access-control data for the user identifier and may obtain results data in accordance with the access-control data such that a unit of data, such as a row or a column, that is identified in the access-control data as accessible to the user identifier and is responsive to the request for data is included in the results data and such that a unit of data, such as a row or a column, that is identified in the access-control data as inaccessible to the user identifier, or for which the access-control data omits or excludes corresponding data indicating that the unit of data is accessible to the user identifier, is omitted or excluded from the results data.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational analysis unit 3700 may be implemented in a distributed configuration, which may include a primary relational analysis unit instance and one or more secondary relational analysis unit instances.

The relational analysis unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency data access and analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency data access and analysis system 3000, the low-latency data stored in the distributed in-memory database 3300, or a combination thereof. For example, the ontological index may include data representing the table and column structure of the distributed in-memory database 3300. The relational analysis unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. For example, the control-word index may include the control-word token "sum", which may be identified in one or more grammars of the low-latency data access and analysis system 3000 as indicating an additive aggregation. The constant index may be an index of constant, or literal, tokens such as "100" or "true". The numeral index may be an index of number word tokens (or named numbers), such as number word tokens for the positive integers between zero and one million, inclusive.

The constituent data index may be an index of the constituent data values stored in the low-latency data access and analysis system 3000, such as in the distributed in-memory database 3300. The relational analysis unit 3700 may generate, maintain, or both, the constituent data index by communicating with, such as requesting data from, the distributed in-memory database 3300. For example, the relational analysis unit 3700 may send, or otherwise communicate, a message or signal to the distributed in-memory database 3300 indicating a request to perform an indexing data-query, the relational analysis unit 3700 may receive response data from the distributed in-memory database 3300 in response to the requested indexing data-query, and the relational analysis unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational analysis unit instances. For example, the ontological index may be replicated on each relational analysis unit instance.

The relational analysis unit 3700 may receive a request for data from the low-latency data access and analysis system 3000. For example, the relational analysis unit 3700 may receive data expressing usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational analysis unit 3700 may receive the data expressing usage intent from the system access interface unit 3900 or from the semantic interface unit 3600. For example, the relational analysis unit 3700 may receive or access the data expressing usage intent in a request for data message or signal.

The relational analysis unit 3700 may process, parse, identify semantics, tokenize, or a combination thereof, the request for data to generate a resolved request, which may include identifying a database and visualization agnostic ordered sequence of tokens based on the data expressing usage intent. The data expressing usage intent, or request for data, may include request data, such as resolved-request data, unresolved request data, or a combination of resolved-request data and unresolved request data. The relational analysis unit 3700 may identify the resolved-request data. The relational analysis unit 3700 may identify the unresolved request data and may tokenize the unresolved request data.

Resolved-request data may be request data identified in the data expressing usage intent as resolved-request data. Each resolved-request data portion may correspond with a respective token in the low-latency data access and analysis system 3000. The data expressing usage intent may include information identifying one or more portions of the request data as resolved-request data.

Unresolved request data may be request data identified in the data expressing usage intent as unresolved request data, or request data for which the data expressing usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing usage intent may include information identifying one or more portions of the request data as unresolved request data. The data expressing usage intent may omit information identifying whether one or more portions of the request data are resolved-request data. The relational analysis unit 3700 may identify one or more portions of the request data for which the data expressing usage intent omits information identifying whether the one or more portions of the request data are resolved-request data as unresolved request data.

For example, the data expressing usage intent may include a request string and one or more indications that one or more portions of the request string are resolved-request data. One or more portions of the request string that are not identified as resolved-request data in the data expressing usage intent may be identified as unresolved request data. For example, the data expressing usage intent may include the request string "example text"; the data expressing usage intent may include information indicating that the first portion of the request string, "example", is resolved-request data; and the data expressing usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing usage intent may omit the tokenization binding data and may include an identifier that identifies the tokenization binding data.

The relational analysis unit 3700 may implement or access one or more grammar-specific tokenizers, such as a tokenizer for a defined data-analytics grammar or a tokenizer for a natural-language grammar. For example, the relational analysis unit 3700 may implement one or more of a formula tokenizer, a row-level-security tokenizer, a data-analytics tokenizer, or a natural language tokenizer. Other tokenizers may be used. In some implementations, the relational analysis unit 3700 may implement one or more of the grammar-specific tokenizers, or a portion thereof, by accessing another component of the low-latency data access and analysis system 3000 that implements the respective grammar-specific tokenizer, or a portion thereof. For example, the natural language processing unit 3710 may implement the natural language tokenizer and the relational analysis unit 3700 may access the natural language processing unit 3710 to implement natural language tokenization. In another example, the semantic interface 3600, the distributed in-memory database, or both, may implement a tokenizer for a grammar for the defined structured query language compatible with or implemented by the distributed in-memory database. In some implementations, the low-latency data access and analysis system 3000, such as the semantic interface 3600, may implement a tokenizer for a grammar for a defined structured query language compatible with or implemented by an external database.

A tokenizer, such as the data-analytics tokenizer, may parse text or string data (request string), such as string data included in a data expressing usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational analysis unit 3700 may traverse one or more of the indexes to identify one or more tokens corresponding to a character, word, or phrase identified in the request string. Tokenization may include identifying multiple candidate tokens matching a character, word, or phrase identified in the request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational analysis unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational analysis unit 3700 may implement. One or more of the finite state machines may be non-deterministic, such that the finite state machine may transition from a state to zero or more subsequent states.

The relational analysis unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational analysis unit 3700 may initiate or execute an operation, such as an entry operation, corresponding to the empty state in response to entering the empty state. Subsequently, the relational analysis unit 3700 may receive input data, and the tokenization finite state machine may transition from the empty state to a state corresponding to the received input data. In some embodiments, the relational analysis unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency data access and analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the defined data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based on one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

TokenScore=FSMScore*(IndexScore+ UBRScore*UBRBoost)+Min (Cardinality Score, 1).

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational analysis unit 3700 may identify a resolved request based on the request string. The resolved request, which may be database and visualization agnostic, may be expressed or communicated as an ordered sequence of tokens representing the request for data indicated by the request string. The relational analysis unit 3700 may instantiate, or generate, one or more resolved-request objects. For example, the relational analysis unit 3700 may create or store a resolved-request object corresponding to the resolved request in the distributed in-memory ontology unit 3500. The relational analysis unit 3700 may transmit, send, or otherwise make available, the resolved request to the semantic interface unit 3600.

In some implementations, the relational analysis unit 3700 may transmit, send, or otherwise make available, one or more resolved requests, or portions thereof, to the semantic interface unit 3600 in response to finite state machine transitions. For example, the relational analysis unit 3700 may instantiate a data-analysis object in response to a first transition of a finite state machine. The relational analysis unit 3700 may include a first data-analysis object instruction in the data-analysis object in response to a second transition of the finite state machine. The relational analysis unit 3700 may send the data-analysis object including the first data-analysis object instruction to the semantic interface unit 3600 in response to the second transition of the finite state machine. The relational analysis unit 3700 may include a second data-analysis object instruction in the data-analysis object in response to a third transition of the finite state machine. The relational analysis unit 3700 may send the data-analysis object including the data-analysis object instruction, or a combination of the first data-analysis object instruction and the second data-analysis object instruction, to the semantic interface unit 3600 in response to the third transition of the finite state machine. The data-analysis object instructions may be represented using any annotation, instruction, text, message, list, pseudo-code, comment, or the like, or any combination thereof that may be converted, transcoded, or translated into structured data-analysis instructions for accessing, retrieving, analyzing, or a combination thereof, data from the low-latency data, which may include generating data based on the low-latency data.

The relational analysis unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational analysis unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency data access and analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency data access and analysis system 3000, or both, for at least a portion of the natural language string. For example, the natural language processing unit 3710 may identify one or more words or terms in the natural language string and may correlate the identified words to tokens defined in the low-latency data access and analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency data access and analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational analysis unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such as among the users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

As used herein, the term "utility" refers to a computer accessible data value, or values, representative of the usefulness of an aspect of the low-latency data access and analysis system, such as a data portion, an object, or a component of the low-latency data access and analysis system with respect to improving the efficiency, accuracy, or both, of the low-latency data access and analysis system. Unless otherwise expressly indicated, or otherwise clear from context, utility is relative within a defined data-domain or scope. For example, the utility of an object with respect to a user may be high relative to the utility of other objects with respect to the user. Express utility indicates expressly specified, defined, or configured utility, such as user or system defined utility. Probabilistic utility indicates utility calculated or determined using utility data and expresses a statistical probability of usefulness for a respective aspect of the low-latency data access and analysis system. Unless otherwise expressly indicated, or otherwise clear from context, utility is access context specific. For example, the utility of an object with respect to the access context of a user may be high relative to the utility of the object with respect to the respective access contexts of other users.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency data access and analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency data access and analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency data access and analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency data access and analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency data access and analysis system 3000, or in a defined data-domain within the low-latency data access and analysis system 3000. The low-latency data access and analysis system 3000 may uniquely, unambiguously, distinguish an object from other objects based on the object identifier associated with the object. The object indexing data for an analytical-object may include data non-uniquely identifying the object. The low-latency data access and analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency data access and analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency data access and analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing usage intent with respect to the low-latency data access and analysis system 3000, which may represent a request to access data in the low-latency data access and analysis system 3000, which may represent a request to access one or more analytical-objects represented in the low-latency data access and analysis system 3000. The object-index search interface may generate one or more object-index queries based on the data expressing usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing usage intent may include a user identifier, and the object search results data may include object search results data sorted or ranked based on probabilistic utility for the user. In another example, the data expressing usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency data access and analysis system 3000, such as for further processing and display to the user.

The object utility unit 3810 may receive, process, and maintain user-specific object utility data for objects represented in the low-latency data access and analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency data access and analysis system configurations to enable, disable, or configure one or more operative features of the low-latency data access and analysis system 3000. The system configuration unit 3820 may store data representing or defining the one or more low-latency data access and analysis system configurations. The system configuration unit 3820 may receive signals or messages indicating input data, such as input data generated via a system access interface, such as a user interface, for accessing or modifying the low-latency data access and analysis system configurations. The system configuration unit 3820 may generate, modify, delete, or otherwise maintain the low-latency data access and analysis system configurations, such as in response to the input data. The system configuration unit 3820 may generate or determine output data, and may output the output data, for a system access interface, or a portion or portions thereof, for the low-latency data access and analysis system configurations, such as for presenting a user interface for the low-latency data access and analysis system configurations. Although not shown in FIG. 3, the system configuration unit 3820 may communicate with a repository, such as an external centralized repository, of low-latency data access and analysis system configurations; the system configuration unit 3820 may receive one or more low-latency data access and analysis system configurations from the repository, and may control or configure one or more operative features of the low-latency data access and analysis system 3000 in response to receiving one or more low-latency data access and analysis system configurations from the repository.

The user customization unit 3830 may receive, process, and maintain user-specific utility data, user defined configuration data, user defined preference data, or a combination thereof. The user-specific utility data may indicate whether a data portion, such as a column, a record, autonomous-analysis (autoanalysis) data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the access context in which feedback was obtained. The user customization data, or a portion thereof, may be stored in an in-memory storage unit of the low-latency data access and analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency data access and analysis system 3000, or a combination thereof. For example, the system access interface unit 3900 may receive signals, message, or other communications representing interactions with the internal data, such as data expressing usage intent and may output response messages, signals, or other communications responsive to the received requests.

The system access interface unit 3900 may generate data for presenting a user interface, or one or more portions thereof, for the low-latency data access and analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the UI via a web browser or a web application and the instructions may be in the form of HTML, JavaScript, or the like.

In an example, the system access interface unit 3900 may include a data-analytics field UI element in the UI. The data-analytics field UI element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The UI may include other UI elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the low-latency data access and analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the low-latency data access and analysis system 3000.

In some embodiments, system access interface unit 3900 may obtain the unstructured string user input as a sequence of individual characters or symbols, the system access interface unit 3900 may aggregate the sequence of individual characters or symbols, and may sequentially transmit, or otherwise make available, a current aggregation of the received user input data to one or more of the other components of the low-latency data access and analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency data access and analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency data access and analysis system 3000 and one or more system access devices associated with, or otherwise accessing, the collaboration context or session.

The third-party integration unit 3920 may include an electronic communication interface, such as an application programming interface (API), for interfacing or communicating between an external, such as third party, application or system, and the low-latency data access and analysis system 3000. For example, the third-party integration unit 3920 may include an electronic communication interface to transfer data between the low-latency data access and analysis system 3000 and one or more external applications or systems, such as by importing data into the low-latency data access and analysis system 3000 from the external applications or systems or exporting data from the low-latency data access and analysis system 3000 to the external applications or systems. For example, the third-party integration unit 3920 may include an electronic communication interface for electronic communication with an external exchange, transfer, load (ETL) system, which may import data into the low-latency data access and analysis system 3000 from an external data source or may export data from the low-latency data access and analysis system 3000 to an external data repository. In another example, the third-party integration unit 3920 may include an electronic communication interface for electronic communication with external machine learning analysis software, which may export data from the low-latency data access and analysis system 3000 to the external machine learning analysis software and may import data into the low-latency data access and analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency data access and analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency data access and analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency data access and analysis system 3000. In another example, the persistent storage unit 3930 may include a first external interface for storing data on, or obtaining data from, a first external persistent storage system, and a second external interface for storing data on, or obtaining data from, a second external persistent storage system.

Turning again to the testing software, using a user-interface (e.g., a web browser), user interactions with a feature may be recorded and output in the form of an executable test program (e.g., a script). That is, a recording tool may be used to record user interactions (e.g., button clicks, drop down selections, text field inputs, URL clicks, etc.). The user interactions may be recorded in the form of a program that can be replayed (e.g., executed). The executable test program may be a Java, a JavaScript, or some other type of executable program.

In the learning mode, the test program can be replayed several times to build a dataset of baseline results. Each replay can produce learning-mode test data. The learning-mode test data from the several replays are used to obtain the dataset of baseline results. The dataset of baseline results can include screens (e.g., screenshots) resulting from the user interactions and captured by the test program, API calls (and input thereto) triggered by the user interactions, API responses to the API calls, API response latencies, additional, fewer, or other baseline results.

A sequence of recorded interactions is referred to herein as an interaction workflow. ML models can be trained using at least some parts of the learning-mode test data to obtain the baseline results, which are used to detect anomalies. For example, the learning-mode data may be filtered, as described herein, to obtain the at least some parts of the learning-mode test data. An anomaly, as used herein, refers to a discrepancy between an expected result and an actual result where the discrepancy is to be reported (e.g., included in a testing result report or output). When a feature is deliberately changed by developers, new learning-mode test data can be obtained and the ML model(s) may be retrained using the new learning-mode test data to obtain new baseline results. ML models can be used to detect anomalies in API response, API performance, and user-interface snapshots of workflows.

Anomalies in server-side performance statistics can also be detected. The testing software can monitor and collect server statistics of a server. The server can be a one or more physical or virtual servers that are or implement the backend tier. The server can be one or more physical or virtual servers that are or implement the data management tier. A server data collection tool (i.e., a statistics collection tool) may execute at the server to collect the server statistics at a regular frequency (e.g., every 0.5 seconds, 1 second, or some other frequency). The server statistics can include one or more of CPU usage, memory usage, process crashes, or other statistics. The testing software can use the server statistics to detect unexpected behavior of these collected metrics (i.e., statistics) while a particular interaction workflow or a particular interaction of the workflow is executing (i.e., being tested).

Figure 4:
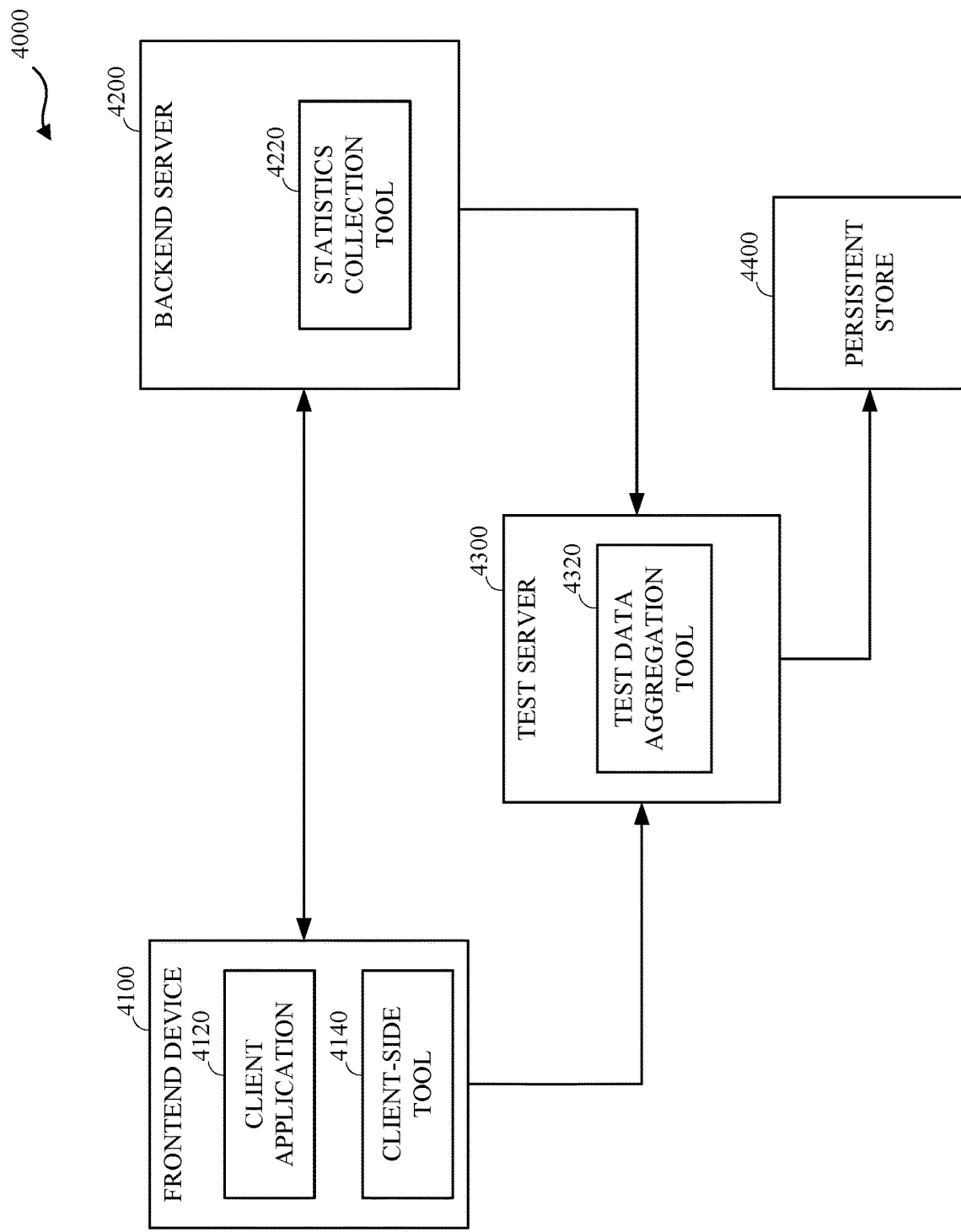
FIG. 4 is a block diagram of an environment where a record-replay test framework with machine learning based assertions can be used.

FIG. 4 is a block diagram of an environment 4000 where a record-replay test framework with machine learning based assertions can be used. The environment 4000 includes a frontend device 4100, a backend server 4200, a test server 4300, and a persistent store 4400. The frontend device 4100, the backend server 4200, and the test server 4300 can each have a configuration that is as described with respect to the computing device 1000 of FIG. 1. The persistent store 4400 can be, or can be as described with respect to, the persistent storage unit 3930 of FIG. 3.

The frontend device 4100 can be a client device that a user can use to access functionality of the backend server 4200. As such, the frontend device 4100 can be, or can be as described with respect to, the system access unit described above with respect to FIG. 3. The frontend device 4100 can include a client application 4120 and an client-side tool 4140. The client application 4120 can be used to present UIs that enable the user to access the functionality of the backend server 4200. The frontend device 4100 may present UIs via a web browser or a web application and the instructions may be in the form of HTML, JavaScript, or the like.

The client-side tool 4140 is a component of the testing software. The client-side tool 4140 (or the testing software as a whole) can be configured to operate in a learning mode or in a testing mode. In the learning mode, the client-side tool 4140 can be configured to record and replay user interactions (workflows) and transmit learning-mode test data to the test server 4300. In the testing mode, the client-side tool 4140 can be configured to execute a recorded workflow to obtain testing-mode test data. The testing-mode test data are transmitted to the test server 4300. While the client-side tool 4140 is shown in FIG. 4 as being separate from the client application 4120, in some implementations, the client-side tool 4140 can be embedded in (e.g., executes within, etc.) the client application 4120.

The backend server 4200 includes a statistics collection tool 4220 that collects server statistics. The statistics collection tool 4220 can collect the server statistics at a regular frequency, which can be once every 0.5 seconds, 1 second, or some other frequency. The statistics collection tool 4220 executes (e.g., collects server statistics) independently of the client-side tool 4140. That is, the statistics collection tool 4220 may be considered to be a parallel thread (process) to a workflow being executed by the client-side tool 4140.

In an example, the backend server 4200 (i.e., the statistics collection tool 4220) transmits the collected statistics to the test server 4300 (i.e., to the test-data aggregation tool 4320). That is, the backend server 4200 pushes the collected statistics to the test server 4300. In another example, the test server 4300 pulls (e.g., transmits a request for, polls for) the collected statistics. For example, responsive to the interaction workflow being updated at the test server 4300, the test server 4300 can pull the collected statistics from the backend server 4200. As such, the test server 4300 can correlate the collected statistics with an interaction workflow or particular API calls. In yet another example, the statistics collection tool 4220 may collect the statistics in response to receiving a request for the server statistics.

The server statistics can include operating system level statistics. The statistics collection tool 4220 can obtain CPU statistics, virtual memory and/or physical memory statistics, process related statistics, other statistics, statistics (or data) regarding crashed processes, or a combination thereof. The server statistics can include a list of currently running processes (e.g., threads) and details therefor of the backend server 4200. The running processes can be those currently managed by an operating system of the backend server 4200. To illustrate, and without loss of generality, the server statistics can be obtained, in an example, using the "top" command of a UNIX-based operating system. The server statistics (i.e., the virtual memory and/or physical memory statistics) can include information regarding the amount of free and used physical and/or swap memory on the backend server 4200. The server statistics can include information regarding shared memory and buffers used by the operating system kernel of the backend server 4200. To illustrate, and without loss of generality, in a UNIX-based operating system, the virtual memory and/or physical memory statistics can be obtained, for example, from the pseudo-file "/proc/meminfo."

A test-data aggregation tool 4320 of the test server 4300 receives learning-mode test data (when the test-data aggregation tool 4320 is configured to execute in the learning mode) and testing-mode test data (when the test-data aggregation tool 4320 is configured to execute in the testing mode). The test-data aggregation tool 4320 can also receive the server statistics from a statistics collection tool 4220. The test-data aggregation tool 4320 stores the received data in the persistent store 4400.

The server statistics can be stored with (e.g., in association with) respective user interaction workflows. The server statistics can include timing data of the times that the statistics collection tool 4220 obtained the server statistics. The test-data aggregation tool 4320 can use the timing data, such as in the case of the server statistics being pushed to the test server 4300, to identify interaction workflows or specific interactions (e.g., specific API calls) of interaction workflows to associate the server statistics with. It is noted that the test server 4300 and the backend server 4200 may be configured with different time zones. As such, the timing data may need to be normalized. One set of server statistics may be associated with more than one interaction (e.g., API call). To illustrate, if first server statistics were collected at a time $t_1$ and server statistics were collected at a time $t_2$, then the first server statistics would be associated with all API calls that occurred between $t_1$ and $t_2$. In the case that the server statistics are pulled from the backend server 4200, timing data need not be used, as described above.

Figure 5:
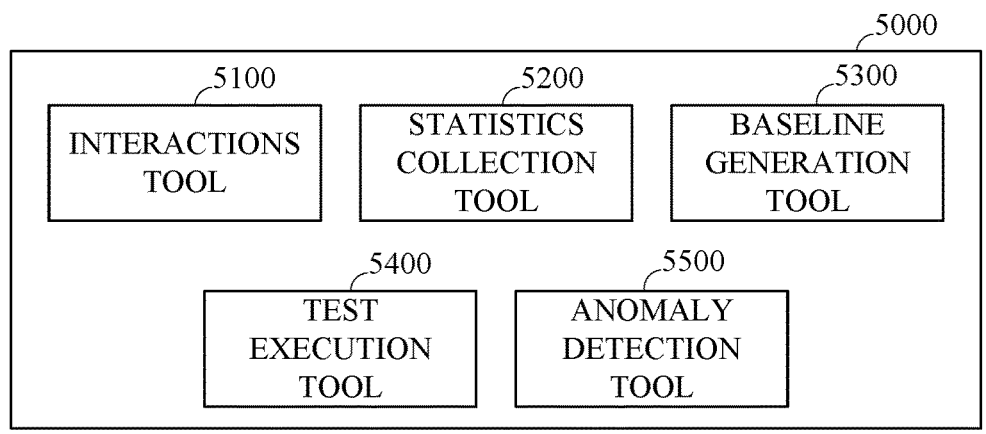
FIG. 5 is a block diagram of example functionality of a record-replay test framework with machine learning based assertions.

FIG. 5 is a block diagram of example functionality of a record-replay test framework with machine learning based assertions (i.e., testing software 5000). The testing software 5000 includes tools, such as programs, subprograms, functions, routines, subroutines, operations, executable instructions, and/or the like for, inter alia and as further described below, training ML models using learning-mode test data obtained during training runs of test workflows to generate baseline data. Testing-mode result data obtained during testing runs of the test workflows are compared to the baseline data to detect (e.g., identify) potential regressions (i.e., anomalies).

At least some of the tools of the testing software 5000 can be implemented as respective software programs that may be executed by one or more computing devices, such as the computing device 1000 of FIG. 1. A software program can include machine-readable instructions that may be stored in a memory such as the memory 1200 or the low-latency memory 1300 of FIG. 1, and that, when executed by a processor, such as processor 1100, may cause the computing device to perform the instructions of the software program.

As shown, the testing software 5000 includes an interactions tool 5100, a statistics collection tool 5200, a baseline generation tool 5300, a test execution tool 5400, and an anomaly detection tool 5500. In some implementations, the testing software 5000 can include more or fewer tools. In some implementations, some of the tools may be combined, some of the tools may be split into more tools, or a combination thereof. For example, the interactions tool 5100 and the test execution tool 5400 may be combined into one tool. The interactions tool 5100 and the test execution tool 5400 can be or can be included in the client-side tool 4140 of FIG. 4. The baseline generation tool 5300 can be or can be included in the test-data aggregation tool 4320 of FIG. 4. The statistics collection tool 5200 can be or can be included in the statistics collection tool 4220 of FIG. 4. The anomaly detection tool 5500 can be or can be included in the test-data aggregation tool 4320 of FIG. 4.

In the learning mode, the interactions tool 5100 can record user interactions. For example, the interactions tool 5100 can be used to record interactions of end users, QA engineers, or any other type of user with the system (or software) for which test cases are to be generated and that is to be automatically tested to detect anomalies. Again, the system to be tested can be the low-latency data access and analysis system 3000 of FIG. 3. The interactions tool 5100 can be or employ record-and-playback techniques or tools to record the interactions. The interactions can be scenario based. For example, a QA engineer may decide that a test scenario (i.e., an interaction workflow) for the login process is needed. The QA engineer may use the interactions tool 5100 to record the set of interactions (i.e., the interaction workflow) that includes all the picks, clicks, inputs, etc. required to complete the interaction workflow through the UI of the system to be tested.

The QA engineer may perform the steps of 1) navigating to the webpage (such as by typing in the address bar of a web browser) "http://mysystem.com/login", 2) clicking in a field labeled "Username", 3) typing the user name "admin," 4) clicking in a field labeled "Password," 5) typing the password "adminPassword," and 6) clicking a button labeled "Submit." If the QA engineer provided accurate credentials, then the system response may be to navigate the user to the User Profile page.

The interactions tool 5100 outputs an executable script as a result of recording an interaction workflow. The executable script can then be replayed to automatically perform the workflow as recorded. Table I illustrates an example of an executable script that may be generated for the login process described above.

TABLE I

| | |
|---|---|
| 1 | goto("http://mysystem.com/login"); |
| 2 | click(getElementByName ("userName")); |
| 3 | fillField(getElementByName ("userName"), "admin"); |
| 4 | click(getElementByName ("password")); |
| 5 | fillField(getElementByName ("password"), "adminPassword"); |
| 6 | press(getElementByName ("submit"); |

It is noted that, for illustration purposes, Table I includes clear text data values. However, the testing software 5000 may store data (e.g., input values) as encrypted data. As such, at least some of the data values shown in Table I would otherwise be encrypted values that are decrypted on demand (i.e., when used). In an example, only sensitive data (e.g., passwords or other Personal Identifiable Information (PII)) are encrypted.

In an example, the recorded script may not include at least some of the input data. Rather, the script may include input data placeholders. The QA engineer may provide values for the placeholders to finalize the script. The QA engineer may provide values for the placeholders by replacing the placeholders with the actual data values in the script itself. In another example, the testing software 500 may provide UIs that, given a test script, can present a list of placeholders to the QA engineer and receive, from the QA engineer, a test data set of input values for the placeholders. The test data set can be stored separately from the executable script itself. As such, one script may be associated with, or executed given, multiple input test data sets. To execute a script, one of the input test data sets must also be selected (e.g., provided, chosen, configured, etc.) along with the script.

It is noted that each of the examples of the functions goto( ), click( ), fillField( ), and press( ) of Table I are functions of the testing software 5000 and are referred to herein as "recordable actions." The testing software 5000 is not limited to these functions and can implement many additional functions. Which function calls are included in a recorded script would depend on the user interactions performed through the UI.

Still in the training mode, the interactions tool 5100 can be used to execute the automated scripts (such as the one of Table I) a number of times to obtain respective learning-mode test data. That is, each execution of the script results in (e.g., generates or captures) corresponding learning-mode test data. Each of respective learning-mode test data are provided to the statistics collection tool 5200. Learning-mode result data can include response time data, response body data, an API response code, screenshots, presentation-independent data, other data, or a combination thereof.

The interactions tool 5100 includes an interceptor that detects API calls from the frontend tier. While an API call is described herein as being made to the backend tier, the disclosure is not so limited. An API call may be to the backend tier or any other service that is accessible via the API call. API calls can include requests for new pages, navigation requests to new pages, asynchronous calls to the backend that may update the contents of a current in place without causing a page change, asynchronous calls to the backend that may not update the contents of the current page, or other types of API calls. The response from the backend to an API call includes response body data, an API response code, or a combination thereof.

In an example, only a subset of API calls may be intercepted. The interactions tool 5100 may be configured to intercept API calls of interest. The interactions tool 5100 may be configured with rules (e.g., regular expressions, a list of API calls of interest, or other types of rules or logic) to identify the API calls of interest. To illustrate the interactions tool 5100 may be configured to intercept API calls that include or are directed to one or more services (e.g., identifiers of the one or more services), one or more actions (e.g., identifiers of the one or more actions), or some other configuration.

The general structure of the implementation of each of the recordable actions includes the steps of 1) updating an interaction object and 2) carrying out the recordable action. In the case that the recordable action includes an API call, the implementation of the recordable action includes 3) obtaining API data related to the API call.

The interactions tool 5100 can also obtain UI data. The UI data can be used to obtain baseline data related to the UI state (e.g., content, layout, etc.) of UIs after a state change to the UI. For example, the UI presented to a user may be updated when an API response is received—the UI may be updated to reflect the API response (or contents thereof). To illustrate, the API response may direct the web browser to a different page. As another illustration, a field of the UI may be configured with auto-completion functionality. As such, for example, in response to a key press of the letter r, an API call may be made to the backend to obtain schema tokens that start with the letter r. The API response may include the tokens revenue and rate. The UI may be updated to show these tokens. In an example, a lag time (e.g., 1 second, 2 seconds, or some other lag time) may be used before obtaining the UI data. In some situations, when an API response is received, the UI may be unstable while it is being update based on the API response. In another example, API responses to multiple API calls may be pending. As such, the lag time can be additionally or alternatively used to ensure that responses from all pending APIs are received. In an example, the same lag time can be used for all API calls and/or interaction workflows. In another example, the lag time may be configured per API call, interaction workflow, some other granularity, or a combination thereof.

A UI state may be associated with particular inputs that result in the state and criteria related to the state itself. In an example, the UI data can include a screenshot of the UI. That is, the interactions tool 5100 can obtain the screenshot of the UI as presented. In an example, the UI data can alternatively, or additionally, include presentation-independent data. For example, assuming that the UI is presented as a web page, then the interactions tool 5100 may traverse the DOM of the webpage to extract a list of UI elements. The UI state can include, the identifiers of the UI elements, the contents of the UI elements, or other aspects of the UI elements.

An interaction object accumulates the user actions of the workflow from the beginning of the workflow up to a current recordable action. While, other representations are possible, for convenience, the interaction object may be represented as a String, interaction. To illustrate, at the beginning of execution of the workflow of Table I, interaction may be set to an empty string. The goto( ) function of line 1 causes the interaction object to be updated to "-->>goto http://mysystem.com/login". The click( ) function of line 2 causes the interaction object to be updated to "-->>goto http://mysystem.com/login-->>click [placeholder='userName']". The fillField( ) function of line 3 causes the interaction object to be updated to "-->>goto http://mysystem.com/login-->>click [placeholder='userName']-->fill [placeholder='userName'] admin". And so on.

Updating the interaction object includes saving the interaction object to a persistent store, such as the persistent store 4400 of FIG. 4. For example, the recordable action (which may be executing in a front end device, such as the frontend device 4100 of FIG. 4) may transmit a request to the baseline generation tool 5300, which may be or may be part of the test-data aggregation tool 4320 of FIG. 4 to save the interaction object to the persistence store. By keeping the interaction object updated with every interaction (i.e., every recordable action) that is being executed in an interaction workflow, the testing software 5000 is enabled to relate API calls, user-interface screenshots, and server statistics with the workflow steps. For example, the testing software can thus determine how statistics related to API calls and server performance are affected by particular setups (e.g., server configurations) where the testing is being performed.

Figure 6:
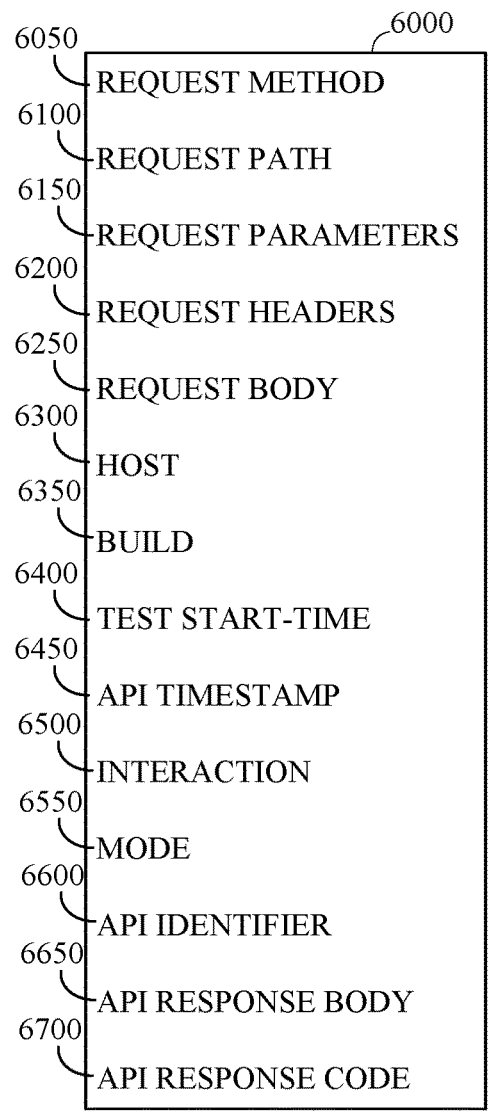
FIG. 6 is a diagram of an example of API data.

In the case that the recordable action includes an API call, API data related to the API calls are saved to the persistent store 4400 of FIG. 4. The API data can be saved in association with the interaction object (i.e., the current value of the interaction object). FIG. 6 is a diagram of an example of API data 6000.

The API data 6000 can include one or more of a request method 6050, a request path 6100, request parameters 6150, request headers 6200, a request body 6250, a host 6300, a build 6350, a test start-time 6400, an API timestamp 6450, an interaction 6500, a mode 6550, an API identifier 6600, an API response body 6650, an API response code 6700, fewer data, more data, or a combination thereof. At least some of the data of the API data 6000 may be captured or derived by the interceptor. For example, the request method 6050, the request path 6100, the request parameters 6150, the request headers 6200, the request body 6250, the host 6300, the API timestamp 6450, the API response body 6650, and the API response code 6700 may be captured or derived by the interceptor. The build 6350 and the mode 6550 may be obtained from configuration data set prior to executing the interaction workflow. While not specifically shown, the API data can also include an interaction workflow identifier that uniquely identified the interaction workflow. Additionally or alternatively, the API data can also include an API identifier that uniquely identified the API.

The request method 6050 indicates whether the request is an HTTP GET, HTTP POST, HTTP PUT, HTTP DELETE, or some other type of request method. The request path 6100 indicates the end point at the backend of the API call. The request parameters 6150 indicate the key-value pairs that may be passed with an HTTP request. The request parameters 6150 may be stored in any suitable format, such as XML, JSON, or some other format. The request headers 6200 include information about the request context of an HTTP request so that the server can tailor its response. To illustrate, a request header may be "accept-language=en-GB." The request body 6250 includes data (input data) sent from the frontend to the backend with the request.

The host 6300 can be name or IP address of a server that is to receive the API request. As mentioned, the host 6300 can be the backend server or some other server. The build 6350 indicates a version (e.g., a build number) of the program code that is to receive and respond to the API call. The test start-time 6400 indicates a timestamp that the test that includes this API call was started. The API timestamp 6450 indicates a timestamp that the API request is transmitted. The interaction 6500 can be as described with respect to the interaction object, supra. That is, the interaction 6500 can be a string descriptive of the interactions of the workflow being executed up to and including the API call.

The mode 6550 indicates whether the API call is made in the learn mode or the test mode. The testing software 5000 can use the mode 6550 to determine whether to user test result data for baseline data generation or for anomaly detection. The API identifier 6600 is an identifier assigned to a particular invocation of the API call. In an example, the API identifier 6600 can be set to a combination (e.g., concatenation) of the interaction 6500 and the request path 6100. The API response body 6650 can be or include the data received in the response to the API call. The API response body 6650 can be, include, or transformed to key-value pairs. The API response code 6700 can include a status code (such as an HTTP status code) that, for example, a server transmits to an API request (which can be an HTTP web browser request).

Figure 7:
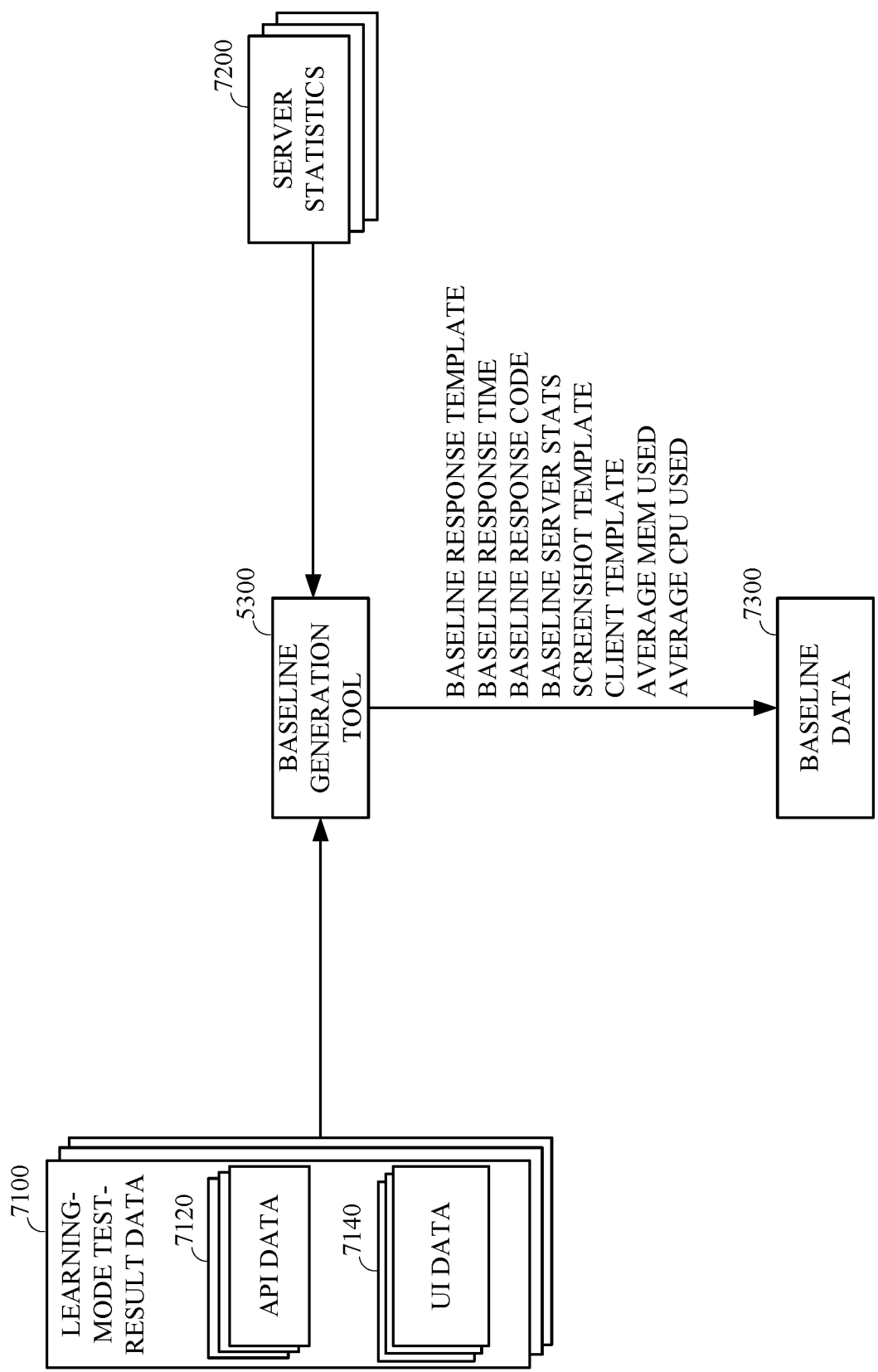
FIG. 7 is a block diagram illustrating operations of the baseline generation tool.

The baseline generation tool 5300 is now described. FIG. 7 is a block diagram illustrating operations of the baseline generation tool 5300. The baseline generation tool 5300 generates baseline data 7300 from a plurality of learning-mode test data 7100 and server statistics 7200. The baseline data 7300 constitute or are considered to be the ground truth that testing-mode test data are then compared to.

The plurality of learning-mode test data 7100 are obtained by executing pre-recorded test scripts, as mentioned above, and from which the plurality of learning-mode test data 7100 were obtained. The plurality of learning-mode test data 7100 can be obtained by executing a same recorded script against a same codebase. However, other aspects can be changed between executions. As alluded to above, the interactions tool 5100 can be used to execute an interaction workflow a predefined number of times (e.g., 5, 10, 50, 100, or some other number of times) to obtain the plurality of learning-mode test data 7100.

Each of the learning-mode test data 7100 can include one or more API data 7120, one or more UI data 7140, or both. The one or more API data 7120 of all of the plurality of learning-mode test data 7100 is referred to herein as a "collection of API data." The one or more UI data 7140 of all of the plurality of learning-mode test data 7100 is referred to herein as a "collection of UI data." Each of the API data can be as described with respect to API data 6000 of FIG. 6. The baseline generation tool 5300 can also receive server statistics 7200. The server statistics 7200 can be received from the statistics collection tool 4220, as described with respect to FIG. 4. That the baseline generation tool 5300 receives the plurality of learning-mode test data 7100 and the server statistics 7200 can mean that the baseline generation tool 5300 retrieves such data from a persistent store, such as the persistent store 4400 of FIG. 4.

The baseline data 7300 can include a baseline API response time ("baseline response time"), a baseline API response template ("response template"), a baseline API response code, baseline server statistics, or a combination thereof. The baseline data 7300 can also include a screenshot template and a client template.

With respect to the baseline API response time, for each different API call (i.e., API identifier), the baseline generation tool 5300 obtains a baseline API response mean and a baseline maximum response distance from the collection of API data. For at least some of the API data of the collection of API data, an API response time is first obtained. The API response time can be calculated as a difference between the timestamp that the API response was received and timestamp that the API request was transmitted (i.e., the API timestamp 6450 of the learning-mode test data). The baseline API response mean (response_mean) can be the mean of all of the calculated API response times. The baseline maximum response distance (max_dist) can be the largest distance (i.e., magnitude difference) between the baseline API response mean and all of the calculated API response times.

In an example, and to stabilize the baseline data, the baseline generation tool 5300 can exclude (e.g., filter out) at least some of the API data of the collection of API data when obtaining the baseline API response mean and the baseline maximum response distance. API data that do not meet inclusion criteria may be filtered out. To illustrate, a lowest percentile (e.g., 5%), an upper percentile (e.g., 5%), or both of the plurality of learning-mode test data 7100 may be filtered out.

With respect to the response template, the baseline generation tool 5300 can use the API response bodies (such as the API response body 6650) of the API data of the collection of API data to obtain (e.g., infer, learn, generate, etc.) the response template. A respective (e.g., corresponding) response template can be obtained for each interaction 6500 and request path 6100 combination. For example, a learning algorithm can be used to determine (e.g., learn, obtain, select, infer, etc.), from the collection of API data the respective response template. For example, the learning algorithm can learn common keys, expected values, expect keys based on input values, expected values based on input values, or other aspects of the API response template. For example, the baseline generation tool 5300 can learn the common (e.g., constant) aspects amongst the API response bodies. In an example, the common keys are included in the response template.

With respect to the baseline API response code, the baseline generation tool 5300 uses the respective API response codes 6700 of the collection of API data to learn the expected baseline response codes corresponding to the different API identifiers.

The baseline generation tool 5300 can also obtain a screenshot template for inclusion in the baseline data 7300. In an example, the screenshot template can be obtained using image convolution techniques to extract salient features from the screenshots of UI data corresponding to a particular interaction workflow. The screenshot template includes or constitutes salient (e.g., invariant) features of these screenshots. The salient features may include or be indicative of a screen layout, relative positionings of fields, and other features that may be input-dependent. In an example, the salient features can be extracted using a convolutional neural network, such as a VGG16 network or any other network that is trained to convert an image into features. In an example, the screenshot template may be obtained using respective medians of every pixel of the screenshots of UI data corresponding to a particular interaction workflow. In yet another example, similarity correlation for image comparison techniques can be used to obtain the screenshot template. The screenshot template can be compared to, such as to obtain a similarity score, a current screenshot (i.e., a screenshot included in UI data obtained in the testing mode). An anomaly can be reported if the similarity score does not meet a similarity criterion.

The baseline data 7300 can also include a client template. The client template can be descriptive of page structures related to a particular UI state. In an example, the baseline generation tool 5300 can obtain, as the client template corresponding to a particular state, DOM similarities amongst the DOM structures of the UI data of the collection of UI data related to the particular state.

With respect to the baseline server statistics, the baseline generation tool 5300 can normalize the server statistics 7200, remove outliers from the server statistics 7200, and analyze the remaining server statistics using an ML model. In an example, a K-means or a K-nearest neighbor clustering algorithm can be used. Using timing information (timestamps) in the server statistics and the plurality of learning-mode test data 7100, the server statistics can be correlated with particular API identifiers. As such, the baseline server statistics can include data such as "the average CPU statistic time when the API identifier X was executing is Y," where X and Y would be an actual API identifier and an actual time, respectively; and/or "the average CPU statistic time when interaction workflow A was executing is B," where A and B would be an actual interaction workflow identifier and an actual time, respectively." As such, certain of the server statistics 7200 can be directly connected to current interactions of executing workflows. Said another way, the baseline generation tool 5300 can connect a current interaction of a workflow and current server statistics. Said yet another way, the baseline generation tool 5300 can infer that particular server statistics are for (e.g., are due to, are caused by, etc.) a particular interaction of a workflow (or the workflow itself). The server statistics 7200 can be used to obtain a range of memory used and a range of CPU used statistics. The average memory used statistic and an average CPU used statistic can be associated with API identifiers or interaction workflow identifiers, are described herein.

Returning to FIG. 5, the test execution tool 5400 can be used to automatically replay recorded test scripts. The test execution tool 5400 obtains testing-mode test data. The test execution tool 5400 can be similar to the interactions tool 5100 in that it can replay recorded scripts. However, the test execution tool 5400 operates in the test mode instead of the learning mode. The test execution tool 5400 captures the same types of data as the interactions tool 5100. However, whereas the data captured by the interactions tool 5100 are used to obtain baseline data, the data captured by the test execution tool 5400 are to be compared to the baseline data to detect (e.g., identify, etc.) anomalies.

As described above, a recorded test script may include any input data required to perform an interaction workflow captured in the recorded test script. As such, replaying the test script may be carried out simply by directing the test execution tool 5400 to replay the test script. In another example, the recorded test script may include placeholders.

To replay such a recorded test script, the test execution tool 5400 may be provided with a test data set.

Testing using the test execution tool 5400 can be performed in an test environment that differs in some respect from the learning mode environment. To illustrate, and without limitations or loss of generality, the difference can be or include a server difference (e.g., an operating system difference), a client-side difference (e.g., a web browser difference or a web browser version difference), a code difference (e.g., a logic difference in the backend tier or in the frontend tier), or a configuration difference (e.g., configuring the backend tier to use a different data management tier). In an example, the testing software 5000 can be used for release testing. For example, the interactions tool 5100 can be used to obtain baseline data (such as the baseline data 7300 of FIG. 7) based on a code base of release number X-1; and test execution tool 5400 can obtain test data for a release number X.

Figure 8:
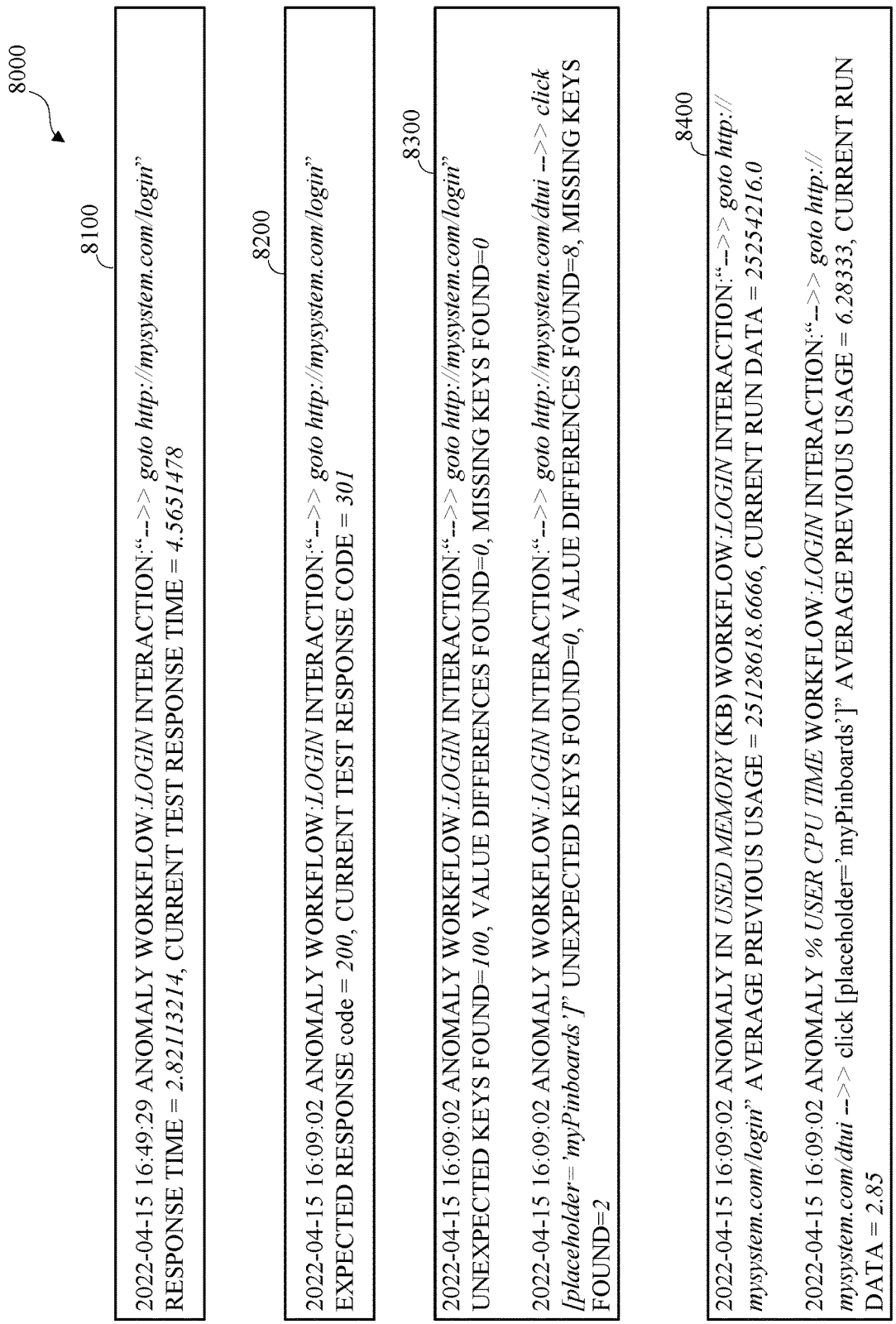
FIG. 8 illustrates examples of anomaly messages.

The anomaly detection tool 5500 detects anomalies in the data received from the test execution tool 5400. FIG. 8 illustrates examples of anomalies 8000 reported by the anomaly detection tool 5500.

With respect to API response time, the anomaly detection tool 5500 can compare an API response time of an API call obtained from the testing-mode test data to a corresponding baseline response time. In an example, the corresponding baseline response time and the API response time correspond if they have the same API identifier. In an example, if the distance (current_dist) between the API response time (current_time) and the API response mean is greater than the baseline maximum response distance by a predetermined tolerance (e.g., 5%, 10%, or some other tolerance), then the anomaly detection tool 5500 reports an anomaly. Symbolically, an anomaly is reported if |current_dist=current_time−response_mean|>max_dist×(1+tolerance). An anomaly message 8100 illustrates an example of a response time anomaly. The anomaly message 8100 includes the interaction object (including the current recordable action) of the workflow, the mean response time (e.g., 2.82113214, and the API response (e.g., 4.5651478).

With respect to API response code, the anomaly detection tool 5500 can compare an response code of the testing-mode test data with the corresponding baseline response code. The corresponding baseline response code and the API response code correspond if they have the same API identifier. If the API codes do not match, then an anomaly (such as an anomaly message 8200 of FIG. 8) is reported.

With respect to API response, the anomaly detection tool 5500 compares the response body of an API response to the corresponding baseline response template of the baseline data 7300. The corresponding baseline response code and the API response code correspond if they have the same API identifier. That is, the testing software 5000 can be said to compare API response bodies for API calls having the same user interaction workflow and request path. The anomaly detection tool 5500 can identify missing keys, unexpected keys, mismatches in some key-value pair (if the API body is in a JSON format), other API response anomalies, or a combination thereof. Anomalies message 8300 illustrate examples of API response body anomalies.

With respect to server statistics, the testing software 5000 can report anomalies similar to anomalies message 8400 that indicate anomalies in CPU time and memory usage. Differences in memory usage are reported if they exceed a memory threshold. Differences in CPU time usage are reported if they exceed a CPU time threshold. The anomaly detection tool 5500 can determine whether the server statistics obtained in the testing mode include a reported crash of a process or a service. A crashed process or service is one that terminated abnormally (such as due to buffer overflows, an unhandled exception, invalid memory addresses, or the like). Responsive to identifying a crash, the anomaly detection tool 5500 outputs an anomaly that includes a description (e.g., a process id or name) of the crashed process or service and a corresponding interaction. In an example, the UI data can include additional client-execution related data. The client-execution related data can include data that may be output to a console of client application 4120 of FIG. 4. Outputs to a console of the browser may be captured by at least one of the interactions tool 5100 or the test execution tool 5400. The anomaly detection tool 5500 can report any errors or warnings that are included in the client-execution related data.

The anomaly detection tool 5500 can also obtain a similarity score between a screenshot included in the testing-mode test data and the screenshots used to obtain the screenshot template. If the score does not meet a similarity criterion, the anomaly detection tool 5500 can output an anomaly message that includes the screen.

Figure 9:
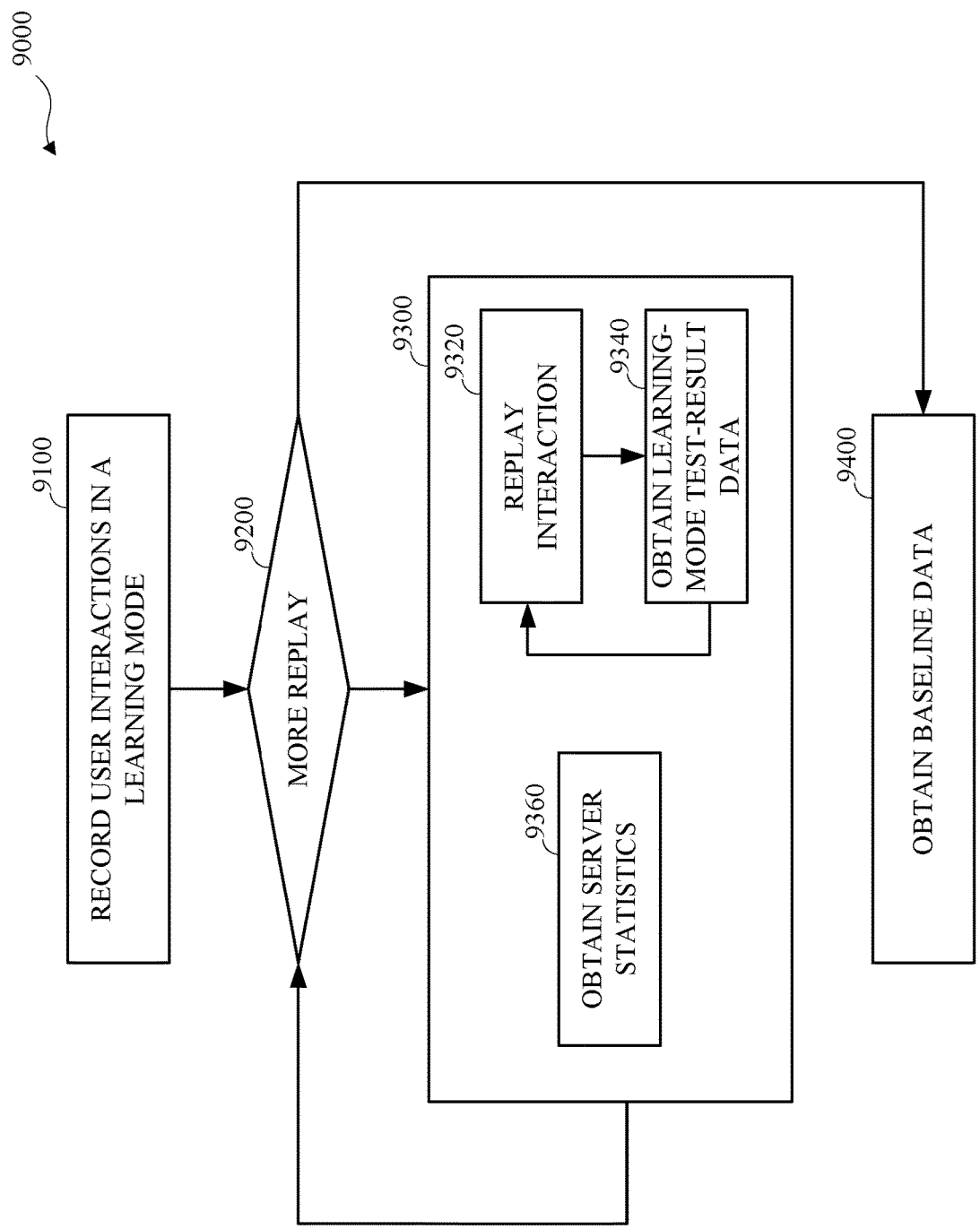
FIG. 9 is a flowchart of an example of a technique of using a record-replay test framework with machine learning based assertions in a learning mode.

To further describe some implementations in greater detail, reference is next made to examples of techniques which may be performed by the testing software. FIG. 9 is a flowchart of an example of a technique 9000 of using the record-replay test framework with machine learning based assertions in a learning mode.

At 9100, user interactions of an interaction workflow are recorded to obtain a test script, such as described with respect to interactions tool 5100. For example, a QA engineer may set the interactions tool 5100 to record interactions of the QA engineer with a UI of a target system. The test script is to be replayed, in a learning mode, a predefined number of times.

At 9200, it is determined whether more replays are still available or whether the test script has been replayed the predefined number of times. If the script has been replayed the predefined number of times, the technique 9000 proceeds to 9400; otherwise the technique 9000 proceeds to 9300 to automatically execute the script one more time. As described above, each execution of the test script can generate (e.g., produce) one or more learning-mode test data and one or more server statistics. The generated learning-mode test data collectively include a collection of API data, a collection of UI data, or a combination thereof.

The API data, the UI data, or both may include object identifiers (e.g., globally unique identifiers (GUIDs)) that may be unique to a particular server (e.g., a backend server 4200) but should not be included in the baseline results. Thus, to avoid having objects identifiers, or other server-specific data that should not be included in the baseline results, at least some of the executions of the test script are performed using different backend servers, such as one or more of the servers 2220, 2240, 2260, and 2280 of FIG. 2.

Executing a script in the learning mode includes, at 9320, executing each of the interactions (i.e., recordable actions) of the interaction workflow and obtaining, at 9340, learning-mode test data corresponding to the interaction. The steps 9320-9340 are performed for all of the recordable actions of the script. In parallel, at 9360, a collection of server statistics are obtained, such as described with respect to statistics collection tool 5200 of FIG. 5. For example, initiating execution of the script can also transmit a request to the statistics collection tool 4220 to start collecting server statistics and transmit the collected server statistics to the test-data aggregation tool 4320. As mentioned, server statistics are obtained at a certain frequency. Thus, respective server statistics can be obtained at each time interval. All the server statistics obtained during an execution of a script can be referred to as "a collection of learning server statistics." At 9400, baseline data are obtained using the collection of API data, the collection of UI data, and the collection of server statistics, as described above.

Figure 10:
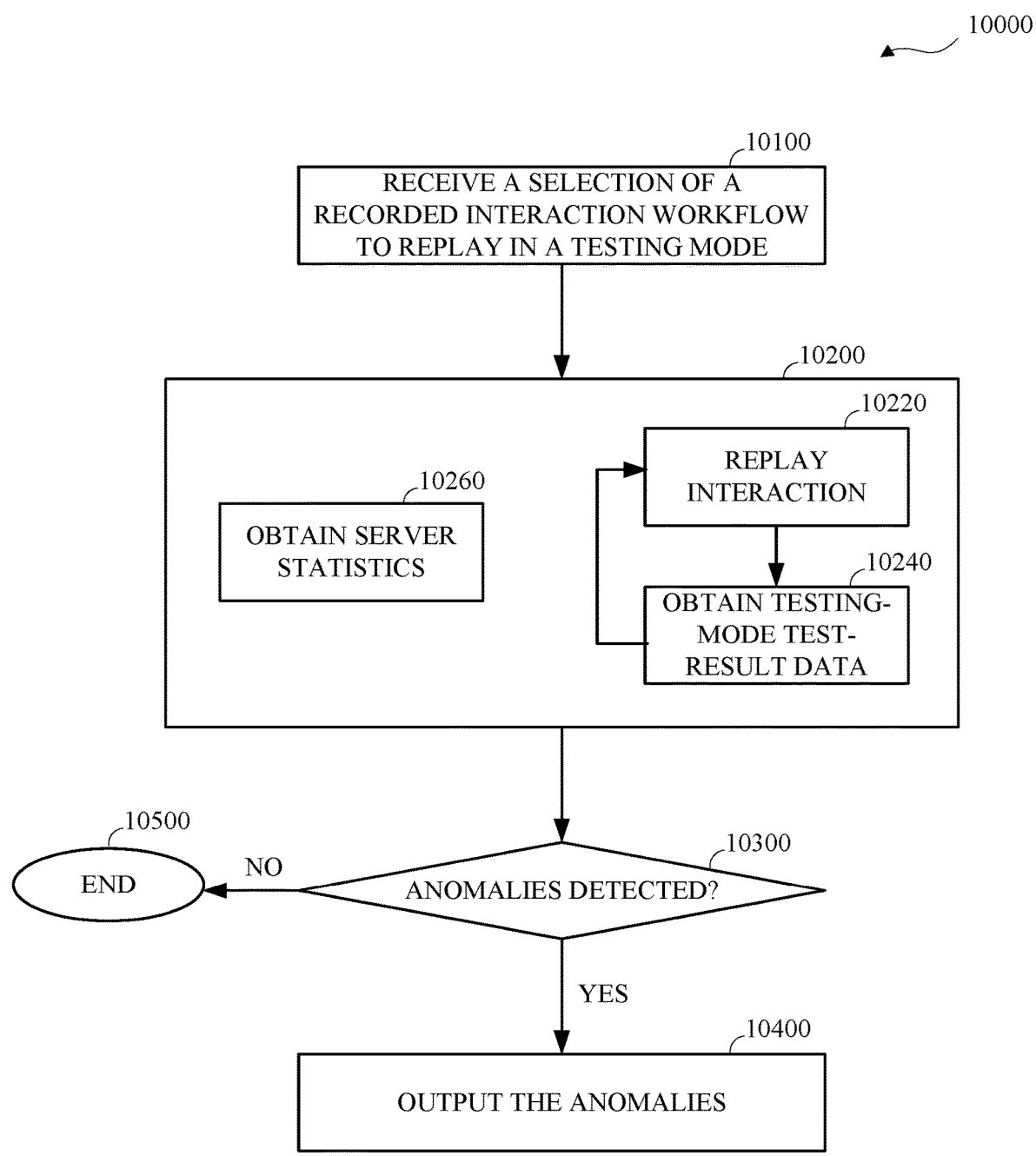
FIG. 10 is a flowchart of an example of a technique of using a record-replay test framework with machine learning based assertions in a testing mode.

FIG. 10 is a flowchart of an example of a technique 10000 of using a record-replay test framework with machine learning based assertions in a testing mode. At 10100, a selection of a recorded script that includes interactions of an interaction workflow is received. The recorded script is to replayed by the testing software in a testing mode. In an example, the selection of the recorded may be received from a person, such as a QA engineer, a developer, or some other person. In an example, the recorded script may be selected by the testing software based on a particular program code being check in, such as into a source code control repository. In an example, the selection of the recorded script may be received (e.g., the script is identified) based on an indication to perform release testing. As such, all recorded scripts may be identified as part of the selection. Other ways of receiving the selection of the recorded interaction workflow are possible.

At 10200, the recorded script is replayed and, in parallel, a collection of testing server statistics are obtained by the statistics collection tool 4220. Executing a script in the testing mode includes, at 10220, executing each of the interactions (i.e., recordable actions) of the interaction workflow and obtaining, at 10240, testing-mode test data corresponding to the interaction. The steps 10220-10240 are performed for all of the recordable actions of the script. In parallel, at 10260, a collection of testing server statistics are obtained, such as described with respect to statistics collection tool 5200 of FIG. 5.

At 10300, the technique 10000 determines whether one or more anomalies are detected. The anomalies can be detected as described above. If anomalies are detected, the technique 10000 outputs the anomalies at 10400; otherwise, the technique 10000 ends at 10500.

Figure 11:
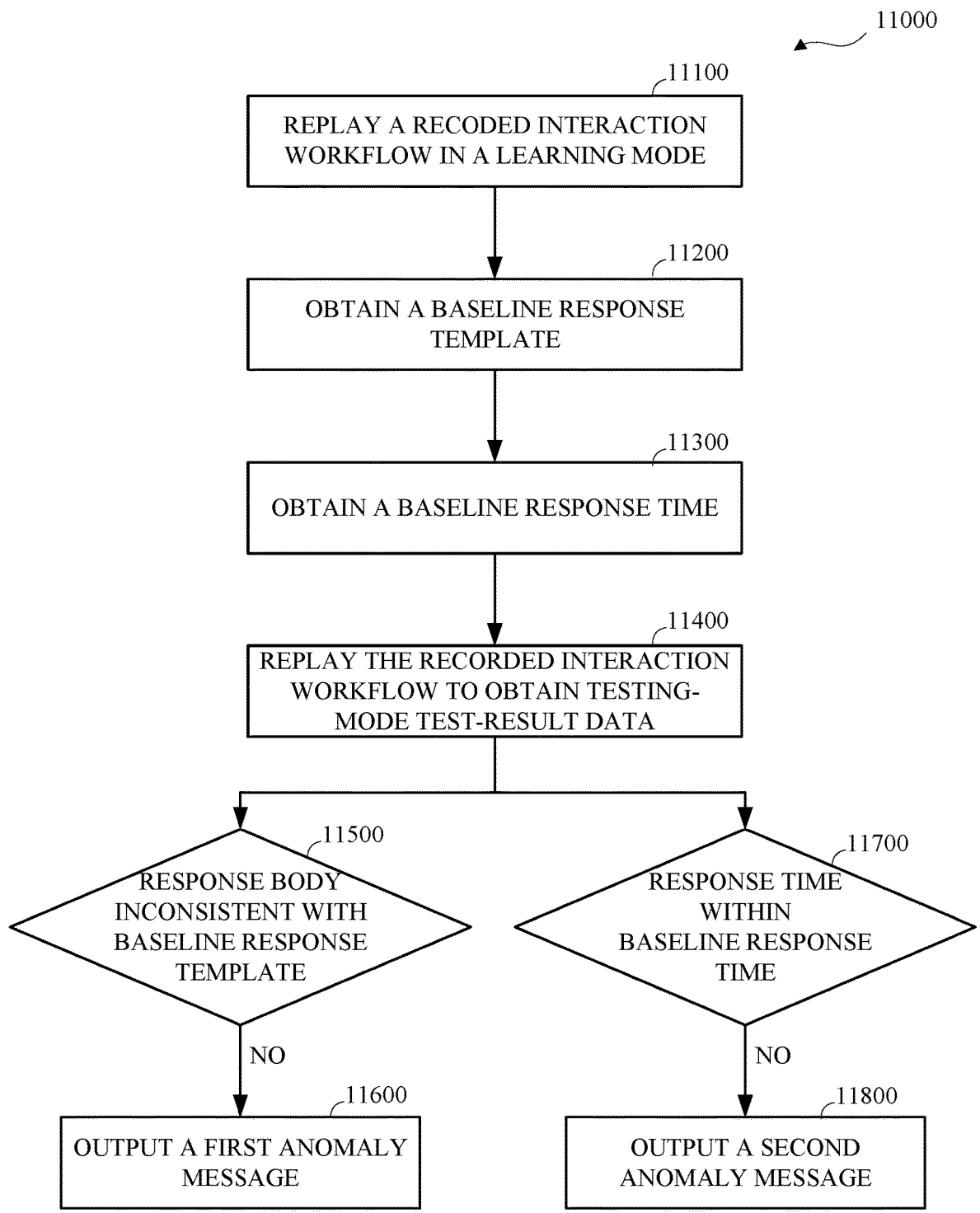
FIG. 11 is a flowchart of an example of a technique for identifying anomalies in test results.

FIG. 11 is a flowchart of an example of a technique 11000 for identifying anomalies in test results. The technique 11000 can be implemented by a testing software that is as described herein. The technique 11000 can be implemented, for example, as a software program that may be executed by computing devices such as the computing device 1000 of FIG. 1. The software program can include machine-readable instructions that may be stored in a memory such as the static memory 1200 of FIG. 1, and that, when executed by a processor, such as the processor 1100 of FIG. 1, may cause the computing device to perform the technique 11000. The technique 11000 can be implemented using specialized hardware or firmware. Multiple processors, memories, or both, may be used.

At 11100, a recorded interaction workflow is replayed to obtain respective learning-mode test data to a request from a client device to a server. The recorded interaction workflow can be replayed a number of times. The replay tool can be a screen replay tool. The recorded interaction workflow can be replayed using a screen replay tool that is configured in a learning mode. The recorded interaction workflow can be obtained using a tool (referred to as "screen record-replay tool") capable at least of recording screen interactions. The screen replay tool can be the test execution tool 5400 of FIG. 1. The screen record-replay tool can be the interactions tool 5100 of FIG. 1. At 11200, a baseline response template is obtained from the respective learning-mode test data. The baseline response template can be obtained as described above. At 11300, a baseline response time of the request is obtained from the respective learning-mode test data. The baseline response time can be obtained as described above.

At 11400, the screen replay tool configured in a testing mode can be used to replay recorded interaction workflow to obtain testing-mode test data, as described above. In an example, the technique 11000 can perform steps 11500-11600. In an example, the technique 11000 can perform steps 11700-11800. In an example, the technique 11000 performs the 11500-11600 and the steps 11700-11800. At 11500, the technique 11000 determines whether a response body included in the testing-mode test data is consistent with (e.g., matches, does not differ from, etc.) the baseline response template. If not, then a first anomaly message is output at 11600. The first anomaly message can be as described with respect to one of anomalies message 8300 of FIG. 8. At 11600, the technique 11000 determines whether a response time included in the testing-mode test data is not within a tolerance of the baseline response time, as described above. If not, then a second anomaly message is output at 11800. The second anomaly message can be as described with respect to the anomaly message 8200 of FIG. 8.

In an example, the testing software can be configured to re-execute a predetermined number of test runs of a script in response to detecting an anomaly. In some situations, a detected anomaly may be a false anomaly that may be due to transient conditions. As such, a test script is re-executed the predetermined number of test runs to determine whether the anomaly is not a false anomaly. If the anomaly persists, then the anomaly is reported; otherwise, the initial anomaly is ignored and not reported. As such, replaying, using the screen replay tool configured in the testing mode, the recorded interaction workflow to obtain the testing-mode test data can include replaying, in the testing mode, the recorded interaction workflow to obtain an initial response time. Responsive to the initial response time not being within the tolerance of the baseline response time, the recorded interaction workflow can be replayed a predefined number of times to obtain the testing-mode test data.

In an example, the technique 11000 can include obtaining, from the server, learning-mode server statistics correlated with preforming the recorded interaction workflow the number of times in the learning mode. A testing-mode server statistic correlated with performing the recorded interaction workflow in the testing mode can be obtained from the server. Responsive to determining that the testing-mode server statistic is outside of a range of the learning-mode server statistics, a third anomaly message that identifies an interaction of the recorded interaction workflow can be output. The testing-mode server statistic can include at least one of a list of processes and respective processor usages at a time of obtaining the testing-mode server statistic, or free and used memory data of the server at the time of obtaining the testing-mode server statistic. In an example, the testing-mode server statistic can include data indicating an abnormal termination of a process at the server. An anomaly message that identifies the abnormal termination and a corresponding interaction of the interaction workflow can be output.

In an example, determining that the response body included in testing-mode test data does not match the baseline response template may include determining that one of the response body or the baseline response template includes a key that is not included in the other of the baseline response template or the response body. In an example, determining that the response body does not match the baseline response template can include determining that the response body and the baseline response template include a non-matching key-value pair.

In an example, obtaining the baseline response time of the request from the respective learning-mode test data can include obtaining the baseline response time using a subset of the respective learning-mode test data that meet inclusion criteria, as described above. As such, obtaining the baseline response time of the request from the respective learning-mode test data can include calculating a response mean as a mean of respective response times of at least some of the respective learning-mode test data and selecting a maximum response distance corresponding to a maximum distance amongst respective distances between the respective response times and the response mean. Additional or alternate anomaly detection criteria can be used. The baseline response time includes the response mean and the maximum response distance. In an example, determining that the response time included in the testing-mode test data is not within the tolerance of the baseline response time can include determining that the response time is not within the tolerance of the baseline response time by comparing a distance between the response time and the response mean to the maximum response distance.

In an example, collections of server statistics can be accumulated as time series data that can be plotted to identify performance patterns. In an example, the server statistics can be correspond to API identifiers. In another example, the server statistics can be correspond to interaction workflows (e.g., interaction workflow identifiers).

The testing software can be integrated into a development pipeline or a continuous integration pipeline such that recorded scripts can be automatically executed in response to, for example, code check-in by developers into a source code control repository.

In an implementation, interactions of end-users with the target system may be recorded to obtain end-user recorded scripts. The end-user recorded scripts may not include data. Rather the end-user recorded scripts can include placeholders, as described above. The end-user recorded scripts can be used to build navigation graphs. That is, all of the end-user recorded scripts may be used to a navigation graph of navigations throughout the target system. The navigation graph comprises nodes and edges. A node corresponds to a state (as described above). Thus, each node can corresponds to an interaction. An edge corresponds to a transition from one state to another based on the interaction (e.g., a recordable action). Edges can be assigned weights based on the frequency of transition as determined by analyzing the end-user recorded scripts.

Particular state transitions (e.g., navigations) can be tested based on (e.g., in proportion to) the frequencies. That is, the more a particular navigation or interactions is performed or followed by end-users the more testing that path receives. Additionally, in an implementation, the testing software can be configured to crawl the recorded scripts. That is, the testing software can use the navigation graph to probabilistically (e.g., based on the edge frequencies) determine a next interaction to replay.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random-access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    replaying, using a replay tool configured in a learning mode, a recorded interaction workflow to obtain respective learning-mode test data responsive to a request from a client device to a server, wherein the recorded interaction workflow is obtained using a screen record-replay tool;
    obtaining a baseline response template from the respective learning-mode test data;
    obtaining a baseline response time of the request from the respective learning-mode test data;
    replaying, using the replay tool configured in a testing mode, the recorded interaction workflow to obtain testing-mode test data, wherein replaying, using the replay tool configured in the testing mode, the recorded interaction workflow to obtain the testing-mode test data comprises:
        replaying, in the testing mode, the recorded interaction workflow to obtain an initial response time; and
        responsive to the initial response time not being within a tolerance of the baseline response time, performing the recorded interaction workflow a predefined number of times to obtain the testing-mode test data;
    determining that a response body included in the testing-mode test data is inconsistent with the baseline response template;
    responsive to determining that the response body is inconsistent with the baseline response template, outputting a first anomaly message;
    determining that a response time included in the testing-mode test data is not within the tolerance of the baseline response time; and
    responsive to determining that the response time is not within the tolerance of the baseline response time, outputting a second anomaly message.

2. The method of claim 1, further comprising:
    obtaining, from the server, learning-mode server statistics correlated with preforming the recorded interaction workflow in the learning mode;
    obtaining, from the server, a testing-mode server statistic correlated with performing the recorded interaction workflow in the testing mode; and
    responsive to determining that the testing-mode server statistic is outside of a range of the learning-mode server statistics, outputting a third anomaly message that identifies an interaction of the recorded interaction workflow.

3. The method of claim 2, wherein the testing-mode server statistic includes at least one of a list of processes and respective processor usages at a time of obtaining the testing-mode server statistic, or free and used memory data of the server at the time of obtaining the testing-mode server statistic.

4. The method of claim 1, further comprising:
    obtaining, from the server, a testing-mode server statistic correlated with performing an interaction of the recorded interaction workflow in the testing mode, wherein the testing-mode server statistic includes data indicating an abnormal termination of a process at the server; and
    outputting a third anomaly message that identifies the abnormal termination and a corresponding interaction of the recorded interaction workflow.

5. The method of claim 1, wherein determining that the response body included in testing-mode test data does not match the baseline response template comprises:
    determining that one of the response body or the baseline response template includes a key that is not included in an other of the baseline response template or the response body.

6. The method of claim 1, wherein determining that the response body does not match the baseline response template comprises:
    determining that the response body and the baseline response template include a non-matching key-value pair.

7. A device, comprising:
    a memory; and
    a processor, the processor configured to execute instructions stored in the memory to:
        receive respective learning-mode test data responsive to a request from a client device to a server, wherein the respective learning-mode test data are received by replaying at the client device, in a learning mode, a recorded interaction workflow that includes the request;
        obtain a baseline response template from the respective learning-mode test data;
        receive testing-mode test data from a replay of the recorded interaction workflow in a testing mode by instructions to:
            replay, in the testing mode, the recorded interaction workflow to obtain an initial response time; and
            responsive to the initial response time not being within a tolerance of a baseline response time, perform the recorded interaction workflow a predefined number of times to obtain the testing-mode test data; and
        responsive to determining that a response body included in the testing-mode test data is inconsistent with the baseline response template, output a first anomaly message.

8. The device of claim 7, wherein the processor is further configured to execute instructions to:
    obtain the baseline response time of the request from the respective learning-mode test data; and
    responsive to determining that a response time included in the testing-mode test data is not within the tolerance of the baseline response time, output a second anomaly message.

9. The device of claim 8, wherein the instructions to obtain the baseline response time of the request from the respective learning-mode test data comprise instructions to:
    obtain the baseline response time using a subset of the respective learning-mode test data that meet inclusion criteria.

10. The device of claim 9, wherein the instructions to obtain the baseline response time of the request from the respective learning-mode test data comprise instructions to:
calculate a response mean as a mean of respective response times included in at least some of the respective learning-mode test data; and
select a maximum response distance corresponding to a maximum distance amongst respective distances between the respective response times and the response mean, wherein the baseline response time comprises the response mean and the maximum response distance.

11. The device of claim 10, wherein the instructions to determine that the response time included in the testing-mode test data is not within the tolerance of the baseline response time comprise instructions to:
determine that the response time is not within the tolerance of the baseline response time by comparing a distance between the response time and the response mean to the maximum response distance.

12. The device of claim 7, wherein the processor is further configured to execute instructions stored in the memory to:
obtain, from the server, learning-mode server statistics correlated with preforming the recorded interaction workflow in the learning mode;
obtain, from the server, a testing-mode server statistic correlated with performing the recorded interaction workflow in the testing mode; and
responsive to determining that the testing-mode server statistic is outside of a range of the learning-mode server statistics, output a second anomaly message that identifies an interaction of the recorded interaction workflow.

13. The device of claim 12, wherein the testing-mode server statistic includes at least one of a list of processes and respective processor usages at a time of obtaining the testing-mode server statistic, or free and used memory data of the server at the time of obtaining the testing-mode server statistic.

14. The device of claim 7, wherein the recorded interaction workflow is replayed at the client device using a screen record-replay tool.

15. A non-transitory computer readable medium storing instructions operable to cause one or more processors to perform operations comprising:
receiving respective learning-mode test data responsive to a request transmitted from a client device to a server, wherein the respective learning-mode test data correspond to replaying using a replay tool at the client device, a number of times and in a learning mode, a recorded interaction workflow that includes the request;
obtaining a baseline response template from the respective learning-mode test data;
receiving testing-mode test data from a replay, using the replay tool in a testing mode, of the recorded interaction workflow, wherein receiving the testing-mode test data from the replay comprises:
replaying, in the testing mode, the recorded interaction workflow to obtain an initial response time; and
responsive to the initial response time not being within a tolerance of a baseline response time, perform the recorded interaction workflow a predefined number of times to obtain the testing-mode test data;
determining that a response template included in the testing-mode test data is inconsistent with the baseline response template; and
responsive to determining that the response template is inconsistent with the baseline response template, outputting a first anomaly message.

16. The non-transitory computer readable medium of claim 15, wherein the operations further comprise:
obtaining the baseline response time of the request based on the respective learning-mode test data; and
responsive to determining that a response time included in the testing-mode test data is not within the tolerance of the baseline response time, outputting a second anomaly message.

17. The non-transitory computer readable medium of claim 16, wherein obtaining the baseline response time of the request from the respective learning-mode test data comprises:
determining the baseline response time using a subset of the respective learning-mode test data that meet inclusion criteria.

18. The non-transitory computer readable medium of claim 16, wherein obtaining the baseline response time of the request from the respective learning-mode test data comprises:
calculating a response mean as a mean of at least some of the respective learning-mode test data; and
selecting a maximum response distance corresponding to a maximum distance amongst respective distances between the at least some of the respective learning-mode test data and the response mean, wherein the baseline response time comprise the response mean and the maximum response distance,
wherein determining that the response time is not within the tolerance of the baseline response time comprises:
determining that the testing-mode test data is not within the tolerance of the baseline response time by comparing a distance between the testing-mode test data and the response mean to the maximum response distance.

19. The non-transitory computer readable medium of claim 15, wherein the operations further comprise:
obtaining, from the server, learning-mode server statistics correlated with preforming the recorded interaction workflow in the learning mode;
obtaining, from the server, a testing-mode server statistic correlated with performing the recorded interaction workflow in the testing mode; and
responsive to determining that the testing-mode server statistic is outside of a range of the learning-mode server statistics, outputting a second anomaly message that identifies an interaction of the recorded interaction workflow.

20. The non-transitory computer readable medium of claim 15, wherein determining that the response template included in the testing-mode test data does not match the baseline response template comprises:
determining that one of the testing-mode test data or the baseline response template includes a key that is not included in an other of the testing-mode test data or the baseline response template or determining that the testing-mode test data and the baseline response template include a non-matching key-value pair.

* * * * *